(12) United States Patent
Rhee et al.

(10) Patent No.: US 7,224,788 B1
(45) Date of Patent: May 29, 2007

(54) METHOD AND DEVICE FOR GENERATING VOICE/TEXT/IMAGE COMMERCIAL INFORMATION RINGBACK TONE DURING COMMUNICATION WAIT

(75) Inventors: Hyoung Chan Rhee, Seoul (KR); Jong Su Hong, Kwangmyoung (KR)

(73) Assignee: Ringfree International Corporation, Paramount, CA (US)

(*) Notice: Subject to any disclaimer, the term of this patent is extended or adjusted under 35 U.S.C. 154(b) by 0 days.

(21) Appl. No.: 09/763,589

(22) PCT Filed: Nov. 17, 1999

(86) PCT No.: PCT/KR99/00690

§ 371 (c)(1),
(2), (4) Date: Feb. 23, 2001

(87) PCT Pub. No.: WO01/06735

PCT Pub. Date: Jan. 25, 2001

(30) Foreign Application Priority Data

| Jul. 19, 1999 | (KR) | 1999-29153 |
| Aug. 12, 1999 | (KR) | 1999-33113 |
| Sep. 27, 1999 | (KR) | 1999-41268 |

(51) Int. Cl.
*H04M 3/42* (2006.01)
*H04M 11/00* (2006.01)

(52) U.S. Cl. .............. 379/207.02; 379/88.13; 379/207.1

(58) Field of Classification Search ............. 379/201.01–201.04, 67.1, 93.12–93.18, 379/88.13, 88.18, 88.22, 68, 70, 77, 207.02, 379/207.04, 207.1, 207.16
See application file for complete search history.

(56) References Cited

U.S. PATENT DOCUMENTS

| 4,811,382 A | * | 3/1989 | Sleevi ..................... 379/67.1 |
| 5,537,533 A | | 7/1996 | Staheli et al. |
| 5,539,809 A | | 7/1996 | Mayer et al. |
| 5,557,658 A | * | 9/1996 | Gregorek et al. ........ 379/88.25 |
| 5,652,784 A | * | 7/1997 | Blen et al. ................. 379/67.1 |
| 5,710,887 A | | 1/1998 | Chelliah et al. |
| 5,880,770 A | * | 3/1999 | Ilcisin et al. ............. 348/14.06 |

(Continued)

FOREIGN PATENT DOCUMENTS

| GB | 2316268 A | 2/1998 |
| JP | 06-121043 | 4/1994 |
| KR | 1003173410000 | 11/2001 |

(Continued)

*Primary Examiner*—Benny Quoc Tieu
(74) *Attorney, Agent, or Firm*—Liu & Liu

(57) ABSTRACT

Voice/text/image commercial information generating method and device during a communication is on wait. The method includes the steps of: checking a telephone call, connecting with a commercial information ringback tone generating system/device at an originating or a receiving communication system when the call is detected, beginning to transmit a commercial information in forms of voice/text/image instead of the original ringback tone or a guide message to an originating telephone from the commercial information ringback tone generating system during a communication wait, requesting a connection to a receiving telephone from the commercial information ringback tone generating system after an A-timeout lapses, continuously transmitting the commercial information to the originating telephone, checking whether the receiving telephone accepts the connection request, stopping the providing of the commercial information ringback tone if the telephone connection is made, connecting a communication line between the originating and the receiving telephones, checking whether the communication is finished, and disconnecting the communication line if the communication finishes.

17 Claims, 21 Drawing Sheets

U.S. PATENT DOCUMENTS

| | | |
|---|---|---|
| 5,931,917 A | 8/1999 | Nguyen et al. |
| 6,587,138 B1 * | 7/2003 | Vogt et al. ............... 348/14.12 |
| 6,603,844 B1 * | 8/2003 | Chavez et al. ......... 379/114.13 |
| 6,608,891 B1 * | 8/2003 | Pelletier et al. ........ 379/207.02 |

FOREIGN PATENT DOCUMENTS

| | | |
|---|---|---|
| WO | WO 96/05684 A1 | 2/1996 |
| WO | WO 98/36585 | 8/1998 |

* cited by examiner

US 7,224,788 B1

METHOD AND DEVICE FOR GENERATING VOICE/TEXT/IMAGE COMMERCIAL INFORMATION RINGBACK TONE DURING COMMUNICATION WAIT

TECHNICAL FIELD

The present invention relates to a method and a device for generating a commercial information ringback tone such as advertisements, music or news during a communication wait, and more particularly to a method and a device for generating voice/text/image commercial information ringback tone during the communication is on wait in which when a telephone caller calls upon a telephone receiver or upon any type of automatic response application systems (ARS, VMS, VISS, PPS) by using ordinary telephones, mobile telephones(CDMA, PCS, TDMA, GSM, AMPS, IMT-2000), video telephones, satellite telephones or internet telephones, the caller can hear and see by providing into the caller's telephone various commercial information such as advertisements, music or news in forms of voice, text or image instead of the waiting signal sound through the telephone.

BACKGROUND ART

In general, when a telephone caller by using ordinary telephones or mobile telephones calls a particular company or a subscriber service center by phone, he or she can hear the commercial advertisements. These advertisements have been very effective since they naturally flow out during the communication wait. In a conventional art, during the communication is on wait, messages such as "hold on for a while", and "other communication is still going on" are repetitively generated to the caller's phone. Recently, a particular service system for some mobile telephones provides voice type advertisements to the caller's phone.

When an user makes a phone call, the user can be provided the advertisements instead of the waiting signal sound or the repeating voice ment informed by a particular service, relax a tiresome state and also can get a telephone charge discount.

Recently, at pharmacies or restaurants provide free call service for the clients. In the free call service, upon hearing advertisements for 10 to 15 seconds, the clients can use the telephone for free.

However, in the conventional free call service, the user must call to the advertisement company at first, hear the advertisement and then input the number he wants to. So, there is a problem that can be happened time consuming and inconvenient aspects.

DISCLOSURE OF THE INVENTION

The object of the present invention is to overcome the above described problem and is to provide a method for generating a voice/text/image commercial information ringback tone through which the telephone originator can hear and see advertisements, music and news in the form of voice, text or image with the background music, and through which the communication company can have the benefit made by providing the commercial information and the advertisement company can maximize the advertisement productivity.

Another object of the invention is to provide an information generating device during the communication wait to achieve the above described method.

To achieve the first object, there is provided a method for generating a voice/text/image commercial information ringback tone through a communication system including a call process function carrying out a transfer of a commercial information to an originating telephone instead of a ringback tone or a guide message during a communication wait till a receiving side is received after the calling from the originating telephone of a subscriber to a receiving side(a receiving telephone of a subscriber or a receiving communication system) is completed, the method comprising the steps of: checking a telephone call(S1), connecting with an information generating device(hereinafter, a commercial information ringback tone generating system/device) at an originating or a receiving communication system when the call is detected(S2), beginning to transmit a commercial information to an originating telephone from the commercial information ringback tone generating system in at least one form of a voice, a text, and/or an image, during a communication wait(S3), requesting a connection to a receiving telephone from the commercial information ringback tone generating system when a first predetermined time(A-timeout) lapses (S4), and continuously transmitting the commercial information to the originating telephone(S5); checking whether the receiving telephone accepts the connection request (S6), checking whether a second predetermined time(B-timeout) lapses since the commercial information ringback tone is provided if the connection request is not accepted (S11), checking whether a telephone connection fails if within the second predetermined time(B-timeout) (S14) and continuously providing the commercial information ringback tone to the originating telephone if the telephone connection does not fail (S5); stopping the providing of the commercial information ringback tone if the telephone connection is made in the step S6(S7), connecting a communication line between the originating telephone and the receiving telephone (S8), checking whether the communication is finished (S9), and disconnecting the communication line if the communication finishes (S10); stopping the sending of the commercial information ringback tone if the second predetermined time(B-timeout) lapses since the connection request in the step S11(S12), and connecting a relay line between an originating switch and a receiving switch (S13); and stopping the sending of the commercial information ringback tone if the connection request fails (S15), releasing the relay line between the originating switch and the receiving switch (S16), checking whether a next connection request is (S17), and beginning to transmit the commercial information to the originating telephone from the commercial information ringback tone generating system (S3).

The method further includes the steps of requesting the connection to the receiving telephone after the first predetermined time(A-timeout) lapses in the step S4, stopping the sending of the commercial information ringback tone and beginning to transmit an original ringback tone or the guide message to the originating telephone when a ringback tone hearing mode is set (S18), checking whether the receiving telephone accepts the request (S19), stopping the providing of the ringback tone of the guide message if the request is accepted (S20), connecting the communication line between the originating telephone and the receiving telephone (S21), checking whether the communication is finished (S22), and disconnecting the communication line between the originating telephone and the receiving telephone (S23).

To achieve the second object of the invention, there is provided an information generating device having a communication system including an originating telephone, a receiving telephone including an ordinary telephone, a mobile phone(CDMA, PCS, TDMA, GSM, AMPS, IMT-2000 type etc), a video phone, a satellite phone, an internet phone etc a subscriber communication line and a relay communication line which are positioned in a switch system, the device comprising: a commercial information server for providing commercial information including advertisement, music, composite information(news, weather, sports, stock information, humor, entertainment etc), subscriber information(bio-rhythm, fortune, position, entertainer information, stock, fee information etc); a voice/text/image commercial information ringback tone generating device for providing a commercial information ringback tone in forms of a voice, a text, or an image from the commercial information server to the originating telephone which is on communication wait through the subscriber communication line, the voice/text/image commercial information Ringback tone generating device being provided in the switch system; a voice/text/image commercial information ringback tone generating system for providing a commercial information ringback tone in forms of a voice, a text, or an image from the server to the originating telephone which is on wait through the relay communication line and the subscriber communication line, the voice/text/image/commercial information ringback tone generating system being provided outside of the switch system; and a subscriber's private information server for providing a subscriber's private information individually in terms of regions, gender, ages and time bands, the commercial information ringback tone is provided depending on the subscriber's private information.

BEST MODE FOR CARRYING OUT THE INVENTION

Hereinafter, preferred embodiments of the present invention will be described with reference to the accompanying figures.

Figure 1:
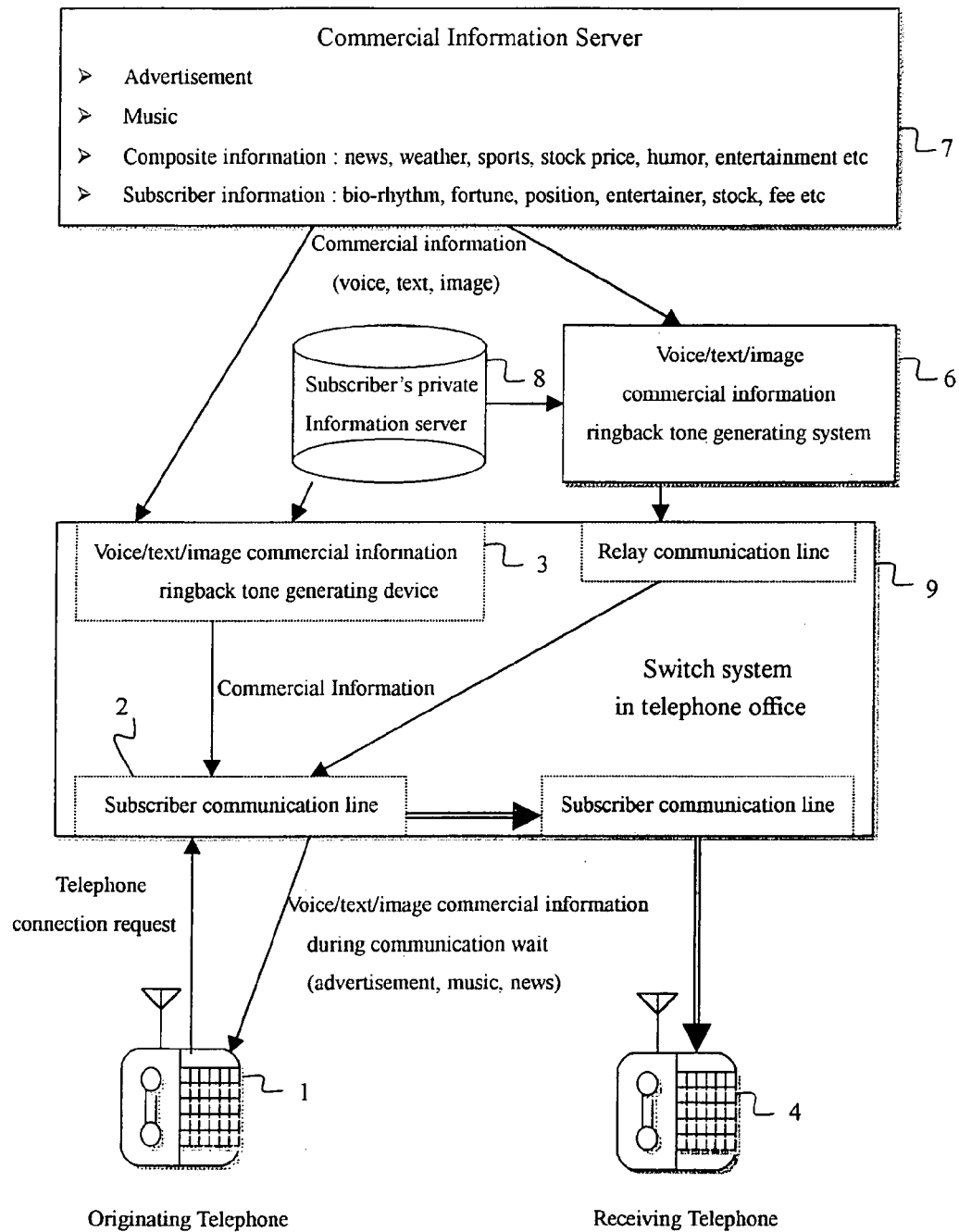
FIG. 1 is a block diagram of a system providing voice/text/image commercial information ringback tone service.

Referring to FIG. 1, which is a system construction diagram for providing a service using a telephone ringback tone having voice/text/image commercial information(advertisement, music, news, stock, weather information etc), the system includes an originating telephone 1 and a receiving telephone 4 including ordinary telephones, video telephones, mobile telephones, satellite telephones and internet telephones, a subscriber communication line 2 and a voice/text/image commercial information ringback tone generating device 3 in a switch system, a relay communication line 5, a voice/text/image commercial information ringback tone generating system 6 and a commercial information server 7, a subscriber's private information server 8 and a switch system 9 in a telephone office.

When a caller makes a call by the originating telephone 1, commercial information such as advertisement, music or news in forms of voice, text or image are provided to originating telephone 1 during a communication wait by commercial information providing server 7 which provides a commercial information ringback tone including advertisement, music, composite information(news, weather, sports, stock evaluation, humor, entertainment) and a subscriber's private information(bio-rhythm, fortune, position, entertainer information, stock, fee etc) through the voice/text/image commercial information ringback tone generating system 6 installed outside of the switch system or the voice/text/image commercial information ringback tone generating device 3 installed inside the switch system.

The voice/text/image commercial information ringback tone generating device 3 in the switch system or the voice/text/image commercial information ringback tone generating system 6 stores the commercial information in forms of voice, music, text or image by the request of the commercial information provider such as advertisement company, broadcast station or stock company. When there is a call from the originating telephone 1, the commercial information are provided to the originating telephone 1 during communication wait from the voice/text/image commercial information ringback tone generating device 3 or the voice/text/image commercial information Ringback tone generating system 6 through the subscriber communication line 2.

Figure 2:
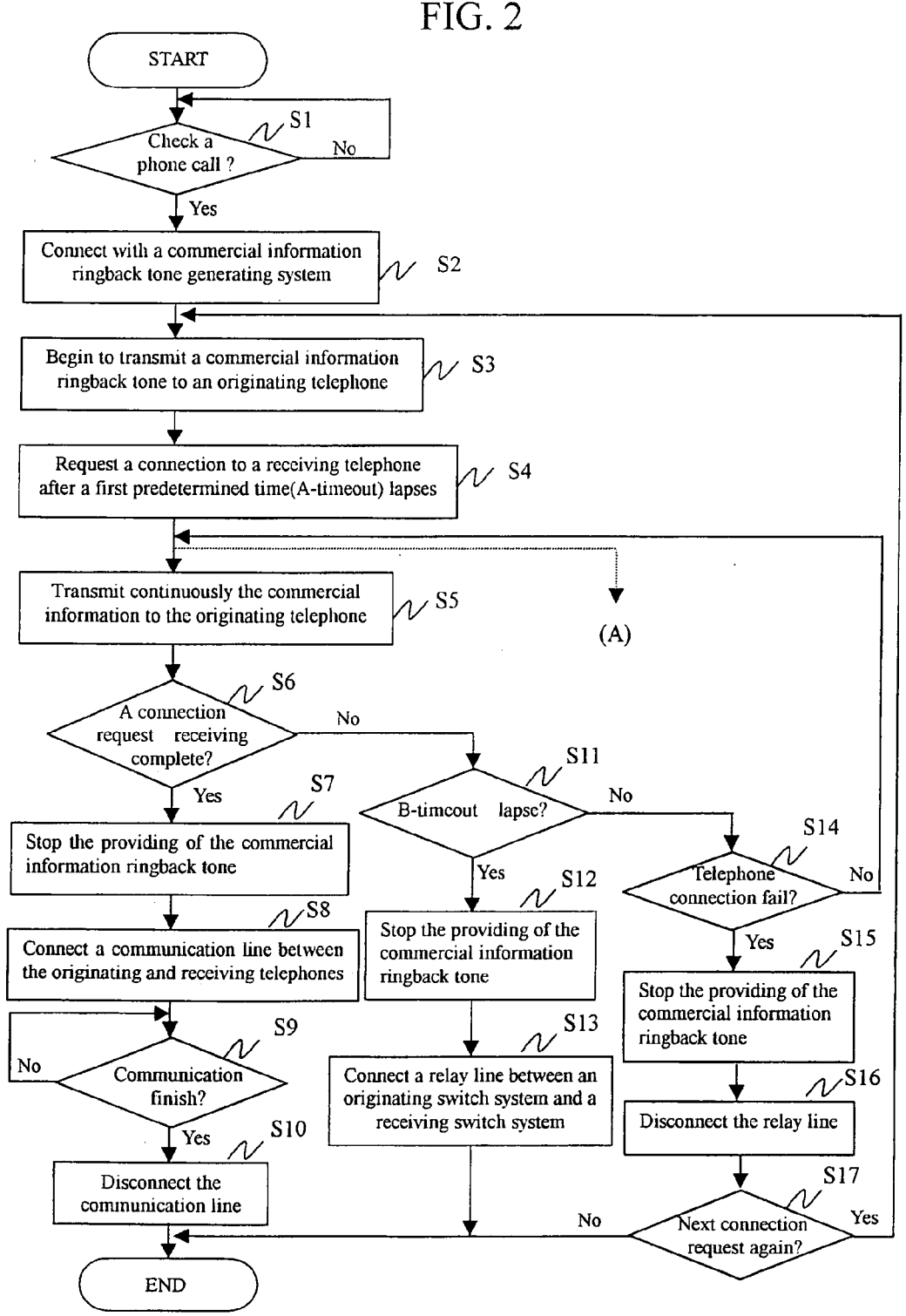
FIG. 2 is a flow chart for illustrating a voice/text/image commercial information providing method during a communication wait according to the present invention.

FIG. 2 is a flow chart for illustrating a method for providing the voice/text/image commercial information during the communication wait according to the present invention.

The method includes the steps of checking a telephone call(S1), connecting with an information generating device (hereafter, a commercial information ringback tone generating system/device) at an originating or a receiving communication system when the call is detected(S2), beginning to transmit a commercial information such as advertisement, music, news, weather, sports, stock evaluation, humor, bio-rhythm, fortune, entertainment, position, fee in at least one form of a voice, or a text, or an image, or a voice and a text, or a voice and an image, or a text and an image, or a voice and a text and an image instead of the original ringback tone or the guide message to an originating telephone from the commercial information ringback tone generating system during a communication wait (S3), requesting a connection to a receiving telephone from the commercial information ringback tone generating system after a first predetermined time(A-timeout) lapses (S4), and continuously transmitting the commercial information to the originating telephone (S5).

The method further includes the steps of: checking whether the receiving telephone accepts the connection request (S6), checking whether a second predetermined time(B-timeout) lapses since the commercial information ringback tone is generated if the connection request is not accepted (S11), checking whether a telephone connection fails if it is within the second predetermined time (S14) and continuously providing the commercial information ringback tone to the originating telephone if the telephone connection does not fail (S5).

The method further includes the steps of: stopping the providing of the commercial information ringback tone if the telephone connection is made in the step S6(S7), connecting a communication line between the originating telephone and the receiving telephone (S8), checking whether the communication is finished (S9), and disconnecting the communication line if the communication finishes (S10).

The method further includes the steps of: stopping the sending of the commercial information ringback tone if the second predetermined time(B-timeout) lapses since the connection request begins in the step S11(S12), and connecting a relay line between an originating switch system and a receiving switch system (S13).

The method further includes the steps of: stopping the sending of the commercial information ringback tone if the connection request fails (S15), releasing the relay line between the originating switch system and the receiving switch (S16), checking whether a next connection request is (S17), and beginning to transmit the commercial information to the originating telephone from the commercial information ringback tone generating system (S3).

Figure 3:
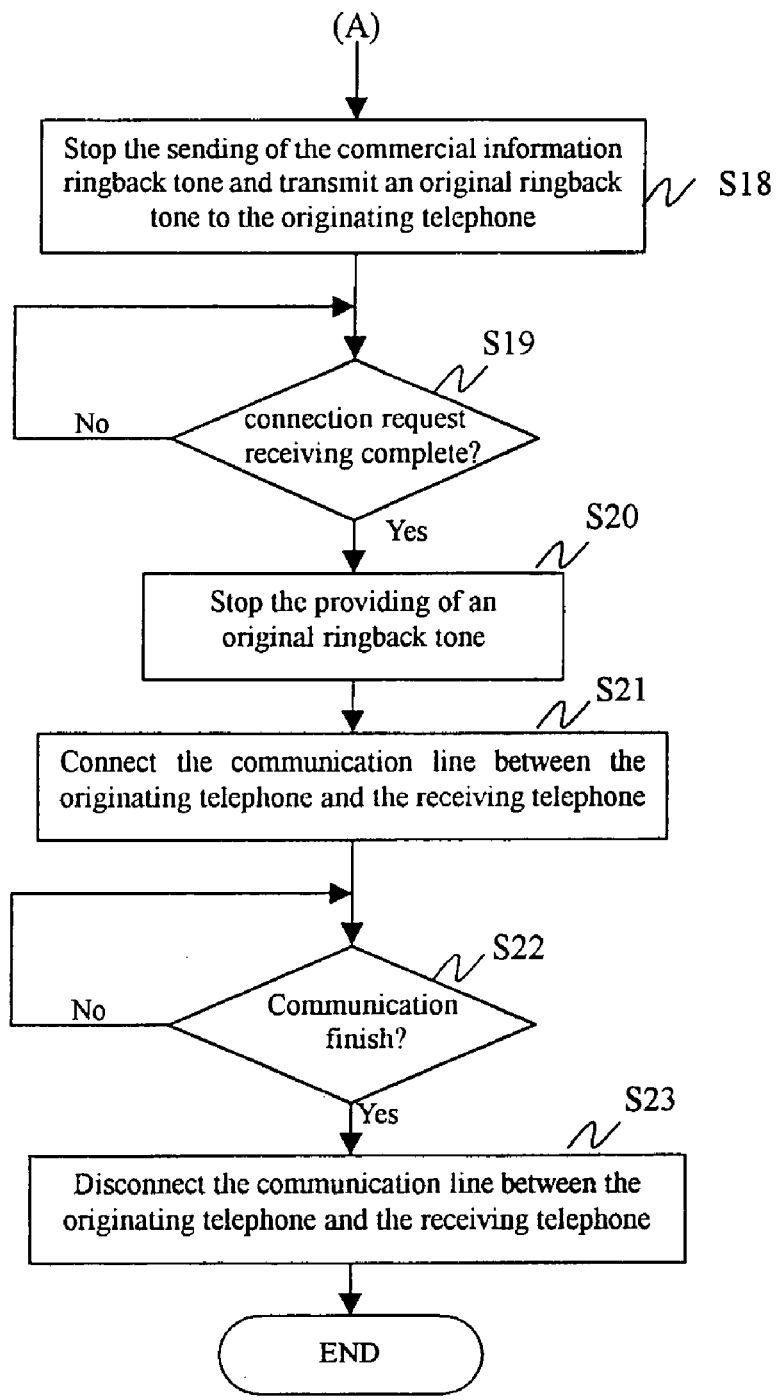
FIG. 3 is a flow chart for illustrating the method to generate an original ringback tone after the voice/text/image commercial information is provided during a communication wait.

Referring to FIG. 3, when a ringback tone hearing mode is set, the method further comprises the steps of requesting a connection to the receiving telephone after the first predetermined time(A-timeout) lapses in the step S4, stopping the sending of the commercial information ringback tone and transmitting an original ringback tone to the originating telephone (S18), checking whether the receiving telephone accepts the request (S19), stopping the providing of the ringback tone if the request is accepted (S20), connecting the communication line between the originating telephone and the receiving telephone (21), checking whether the communication is finished (S22), and disconnecting the communication line between the originating telephone and receiving telephone (S23).

Figure 4:
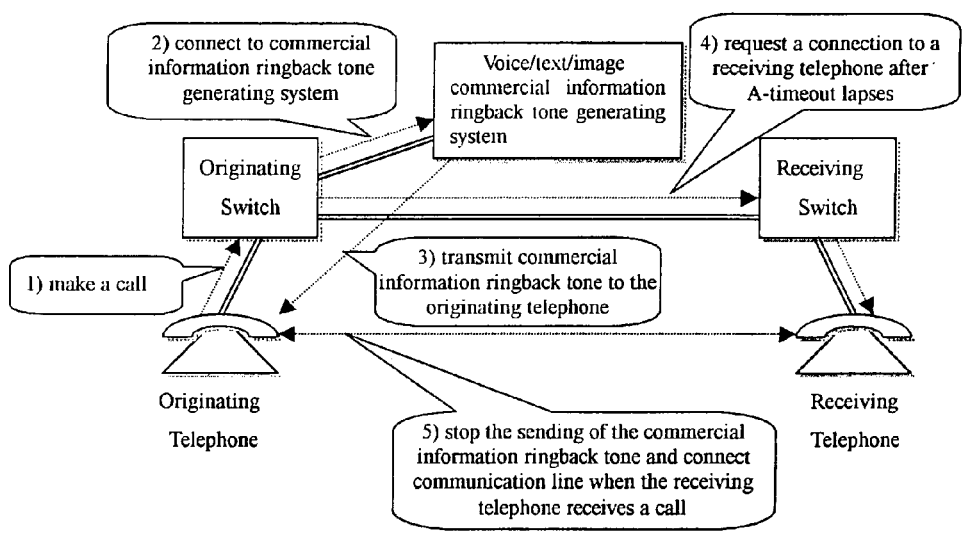
FIG. 4 is a connection diagram between systems using commercial information ringback tone generating system at an originating switch system such as switch, PABX etc.

FIG. 4 is a connection diagram between systems using the commercial information ringback tone generating system at the originating switch system. The originating switch system includes a switch, PABX and other switch.

Figure 5A:
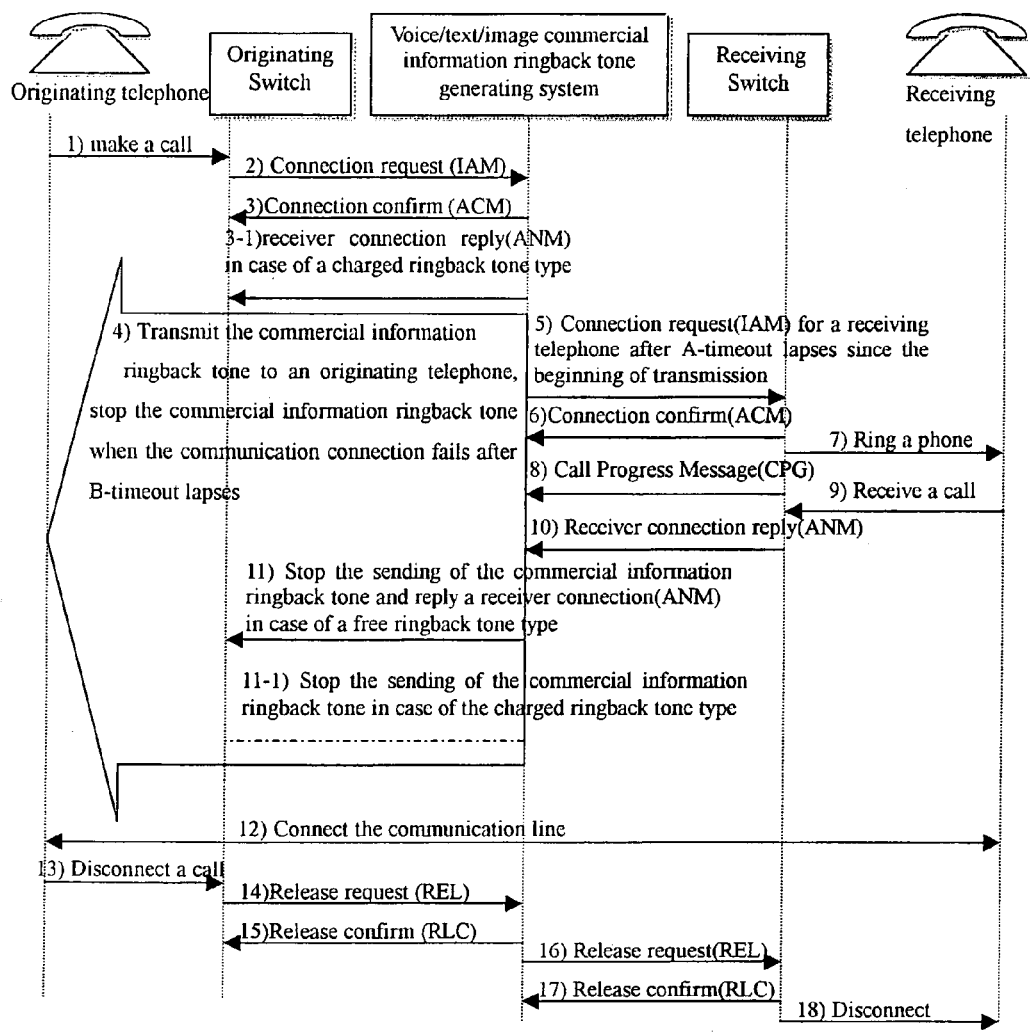
FIG. 5a shows a commercial information ringback tone generating procedure in case where the commercial information Ringback tone generating system is used as a toll station at the originating switch system according to a first embodiment of the invention.

FIG. 5*a* illustrates a commercial information ringback tone generating procedure in case where the commercial information ringback tone generating system is used as a toll station at the originating switch system in accordance with a first embodiment of the invention.

The first embodiment includes the steps of: requesting a connection to the commercial information ringback tone generating system by sending an initial address message (IAM) from the originating switch system (2) when the originating telephone makes a call to the originating switch system (1), confirming the connection from the commercial information ringback tone generating system by sending an address complete message(ACM) to the originating switch system (3), replying a receiver connection by sending an answer message(ANM) from the commercial information ringback tone generating system to the originating switch system in case of a charged ringback tone type (3-1), transmitting the commercial information ringback tone (advertisement, music, news, stock, weather, fortune and so on) from the commercial information ringback tone generating system to the originating telephone, stopping the commercial information ringback tone when the communication connection fails after the second predetermined time(B-timeout) lapses (4).

The method further includes the steps of: requesting a connection for a receiving telephone to a receiving switch system from the commercial information ringback tone generating system by sending the initial address message (IAM) after the first predetermined time(A-timeout) lapses (5) since the beginning of the commercial information transmission, confirming the connection from the receiving switch system by sending the address complete message (ACM) to the commercial information ringback tone generating system (6), ringing the receiving telephone from the receiving switch system (7), sending a call progress message (CPG) from the receiving switch system to the commercial information ringback tone generating system (8), answering (10) a receiving telephone connection to the commercial information ringback tone generating system from the receiving switch system by sending an answer message (ANM) when a receiver receives a call the receiving telephone (9), answering the receiving telephone connection to the originating switch system from the commercial information ringback tone generating system by stopping the sending of the commercial information ringback tone and sending the answer message(ANM) in case of free ringback tone type (11), and stopping the sending of the commercial information ringback tone to the originating switch system from the commercial information ringback tone generating system in case of the charged ringback tone type (11-1).

The method further includes the steps of: connecting the communication line between the originating telephone and the receiving telephone (12).

The method further includes the steps of: requesting (14) a release to the commercial information ringback tone generating system from the originating switch system by sending a release message(REL) when the originator is disconnected (13), confirming the release to the originating switch system from the commercial information ringback tone generating system by sending a release complete message(RLC) (15), requesting a release to the receiving switch system from the commercial information ringback tone generating system by sending a release message(REL)(16), confirming the release to the commercial information ringback tone generating system from the receiving switch system by sending a release complete message(RLC)(17), and finishing the communication by disconnecting the receiving telephone from the receiving switch system (18).

Figure 5B:
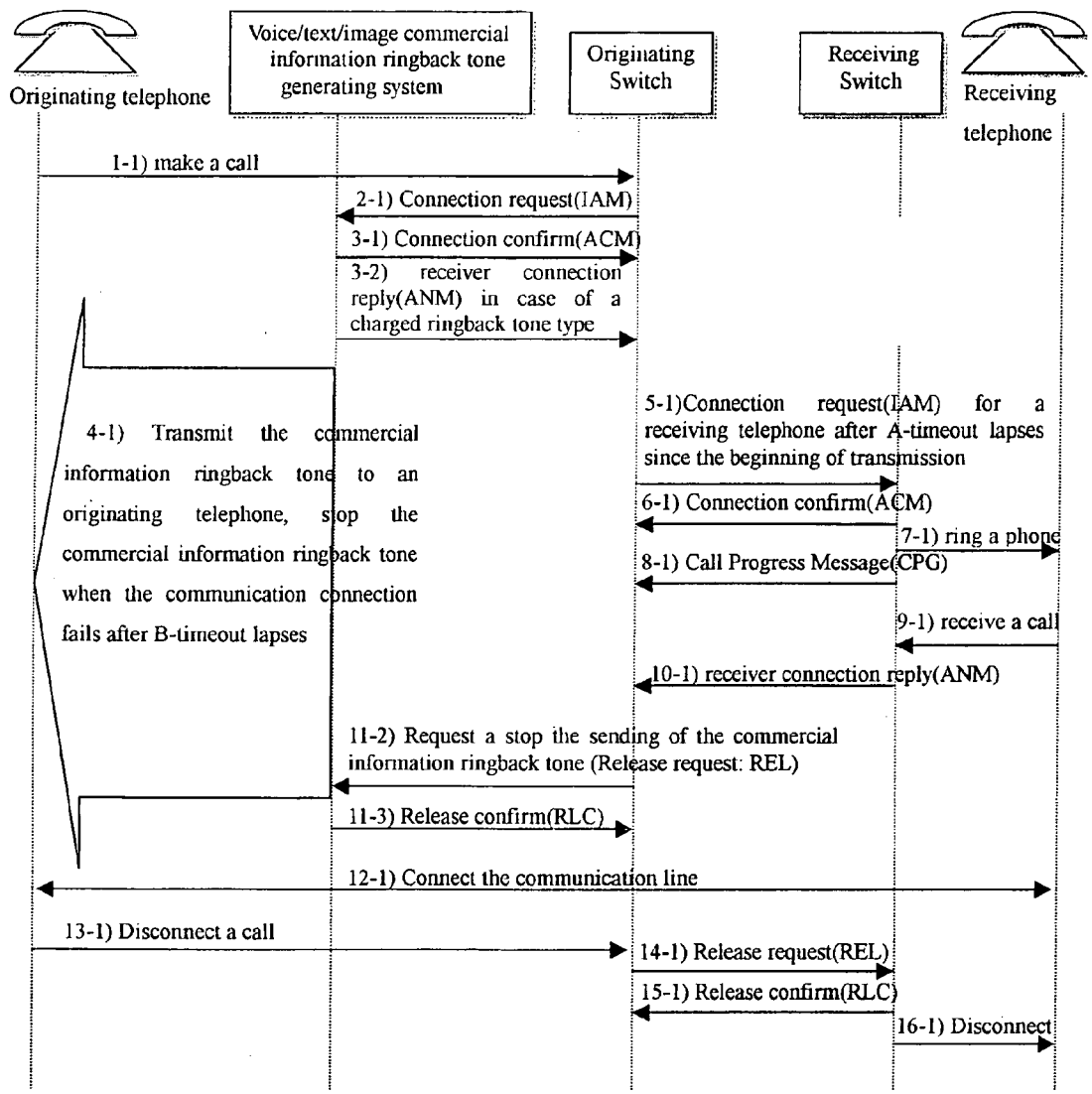
FIG. 5b shows a commercial information ringback tone generating procedure in case where the commercial information ringback tone generating system is used as an end station at the originating switch system according to a first embodiment of the invention.

FIG. 5*b* shows the procedure for generating commercial information ringback tone in a case where the commercial information ringback tone generating system is used as an end station in the originating switch system according to the first embodiment of the invention.

The method includes the steps of: requesting (2-1) a connection to the commercial information ringback tone generating system by sending an initial address message (IAM) from the originating switch system when the originating telephone makes a call to the originating switch system (1—1), confirming the connection from the commercial information ringback tone generating system by sending an address complete message(ACM) to the originating switch system (3-1), replying (3-2) a receiver connection from the commercial information ringback tone generating system to the originating switch system by sending an answering message (ANM) in case of the charged ringback tone type.

The method further includes the steps of: transmitting the commercial information ringback tone(advertisement, music, news, stock, weather, fortune and so on) from the commercial information ringback tone generating system to the originating telephone, stopping (4-1) the commercial information ringback tone when the connection fails after the second predetermined time(B-timeout) lapses.

The method further includes the steps of: requesting a connection for a receiving telephone to a receiving switch from the originating switch system by sending the initial address message(IAM) after the first predetermined time(A-timeout) lapses (5-1) since the beginning of the commercial information transmission, confirming the connection from the receiving switch system by sending the address complete message(ACM) to the originating switch system (6-1), ringing the receiving telephone from the receiving switch system (7-1), sending a call progress message(CPG) from the receiving switch system to the originating switch system (8-1). When a receiver receives a call with the receiving telephone (9-1), a receiver connection is done by replying (10-1) a receiving telephone connection to the originating switch system from the receiving switch system by sending an answer message(ANM), and requesting a stop of the commercial information ringback tone from the originating switch system by sending a release message to the commercial information ringback tone generating system (11-2).

The method further includes the steps of: confirming the release to the originating switch system from the commercial information ringback tone generating system by sending a release complete message(RLC) (11-3), connecting the communication line between the originating telephone and the receiving telephone (12-1) through the originating and receiving switch systems.

When the originator disconnects the communication (13-1), the method further goes through the steps of: requesting a release to the receiving switch system from the originating switch system by sending a release message(REL) (14-1), confirming the release to the originating switch system from the receiving switch system by sending a release complete message(RLC) (15-1), and finishing the communication by disconnecting the receiving telephone from the receiving switch system (16-1).

Figure 6:
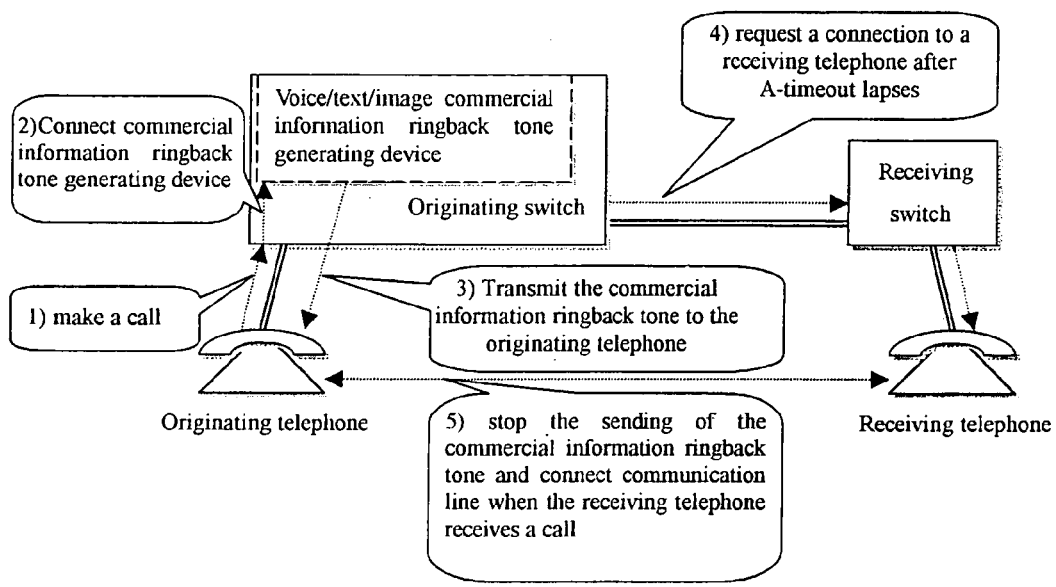
FIG. 6 is a connection diagram between systems using the commercial information ringback tone generating system in the originating switch system.

FIG. 6 is a schematic diagram for illustrating a connection between systems using the commercial information ringback tone generating device in the originating switch system.

Figure 7:
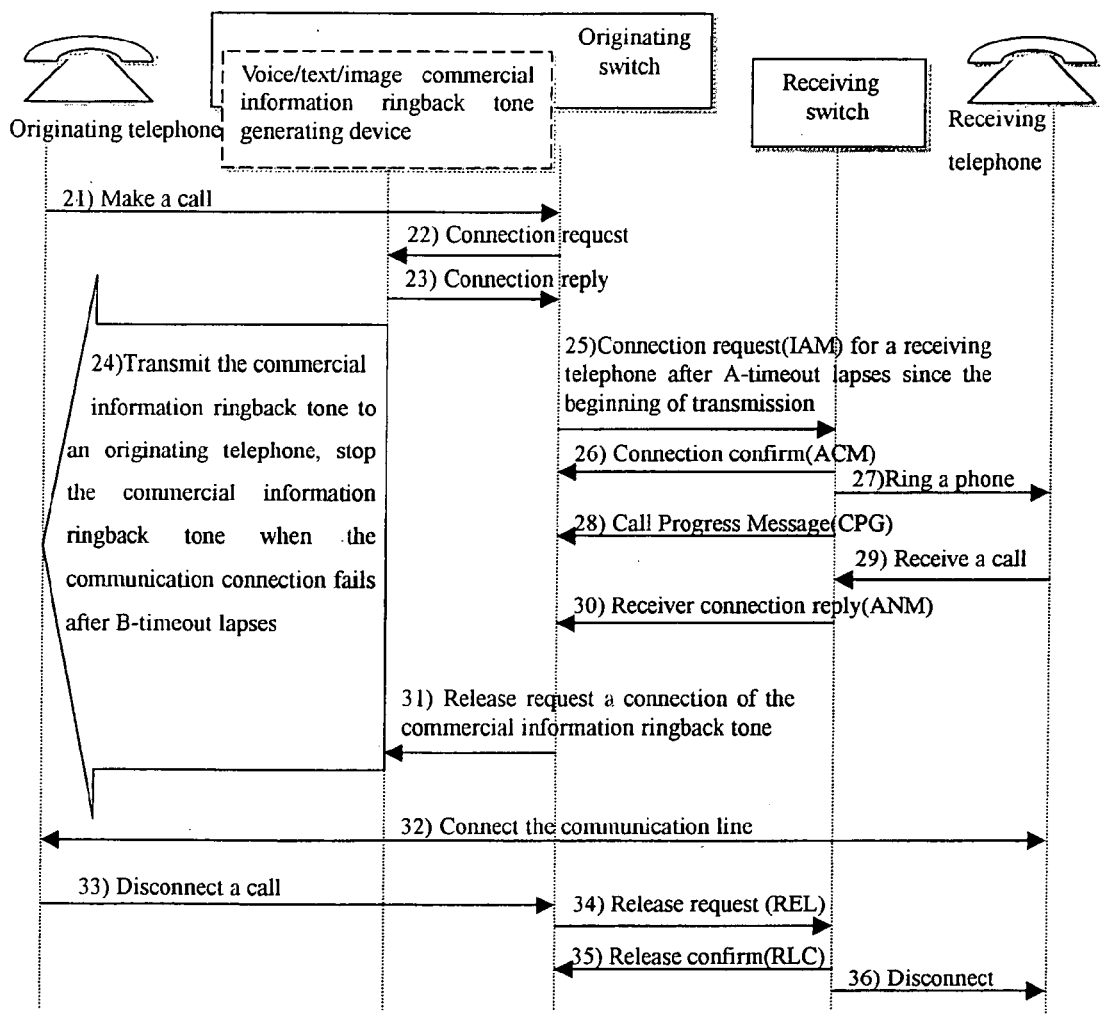
FIG. 7 shows a commercial information ringback tone generating procedure by the commercial information ringback tone generating device in the originating switch system in accordance with a second embodiment of the invention.

FIG. 7 shows a procedure for generating the commercial information ringback tone in a case where the commercial information ringback tone generating device in the originating switch system is used according to a second embodiment of the invention.

The second embodiment includes the steps of: making a call the originating telephone to the originating switch system (21), requesting a connection to the commercial information ringback tone generating device from the originating switch system (22), and replying the connection from the commercial information ringback tone generating device to the originating switch system (23).

The method further includes the steps of: transmitting the commercial information ringback tone to the originating telephone from the commercial information ringback tone generating device and when the connection fails after the second predetermined time(B-timeout) lapses, stopping the commercial information ringback tone (24).

The method further includes the steps of: requesting a connection to the receiving switch system by sending an initial address message(IAM) from the originating switch system (25) after a first predetermined time(A-timeout) lapses since the beginning of the commercial information ringback tone transmission, confirming the connection to the originating switch system by sending an address complete message(ACM) from the receiving switch system (26), ringing the receiving telephone from the receiving switch system (27), sending a call progress message(CPG) from the receiving switch system to the originating switch system (28), replying a receiver connection (30) to the originating switch system by sending an answer message(ANM) from the receiving switch system when a receiver receives a call with the receiving telephone (29), and requesting a release of the commercial information ringback tone to the commercial information ringback tone generating device from the originating switch system (31).

The method further includes the steps of: connecting a communication line between the originating telephone and the receiving telephone (32).

The method further includes the steps of: requesting (34) a release to the receiving switch system from the originating switch system by sending a release message(REL) when the originating telephone is disconnected from the originating switch system (33), confirming the release to the originating switch system from the receiving switch system by sending a release complete message(RLC) (35), and finishing the communication by disconnecting the receiving telephone from the receiving switch system (36).

Figure 8:
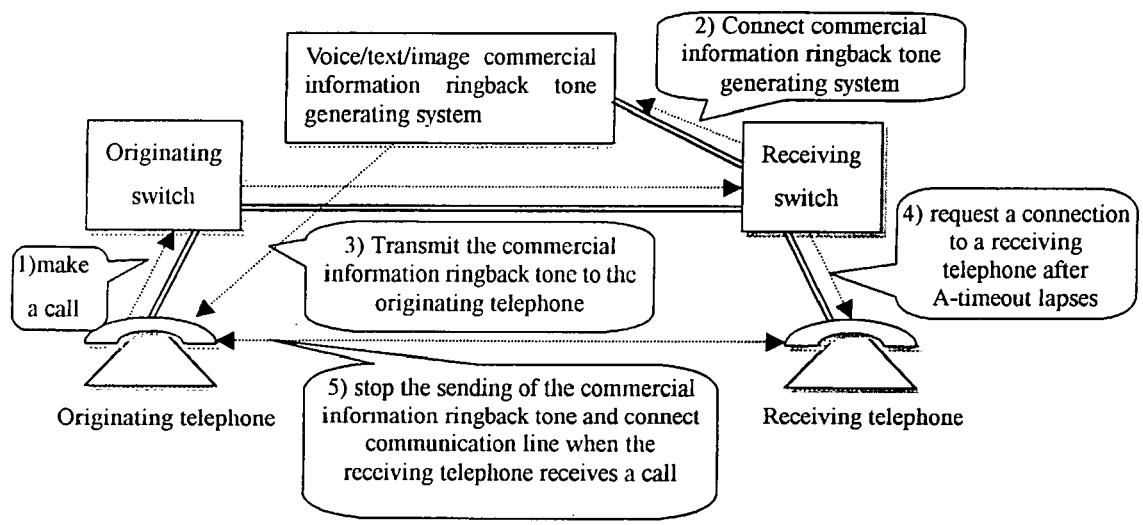
FIG. 8 is a system connection diagram using commercial information ringback tone generating system at a receiving switch system.

FIG. 8 is a schematic diagram for illustrating a connection between systems using the commercial information ringback tone generating device at the receiving switch system. The receiving switch system includes a switch, a PABX and other switches.

Figure 9A:
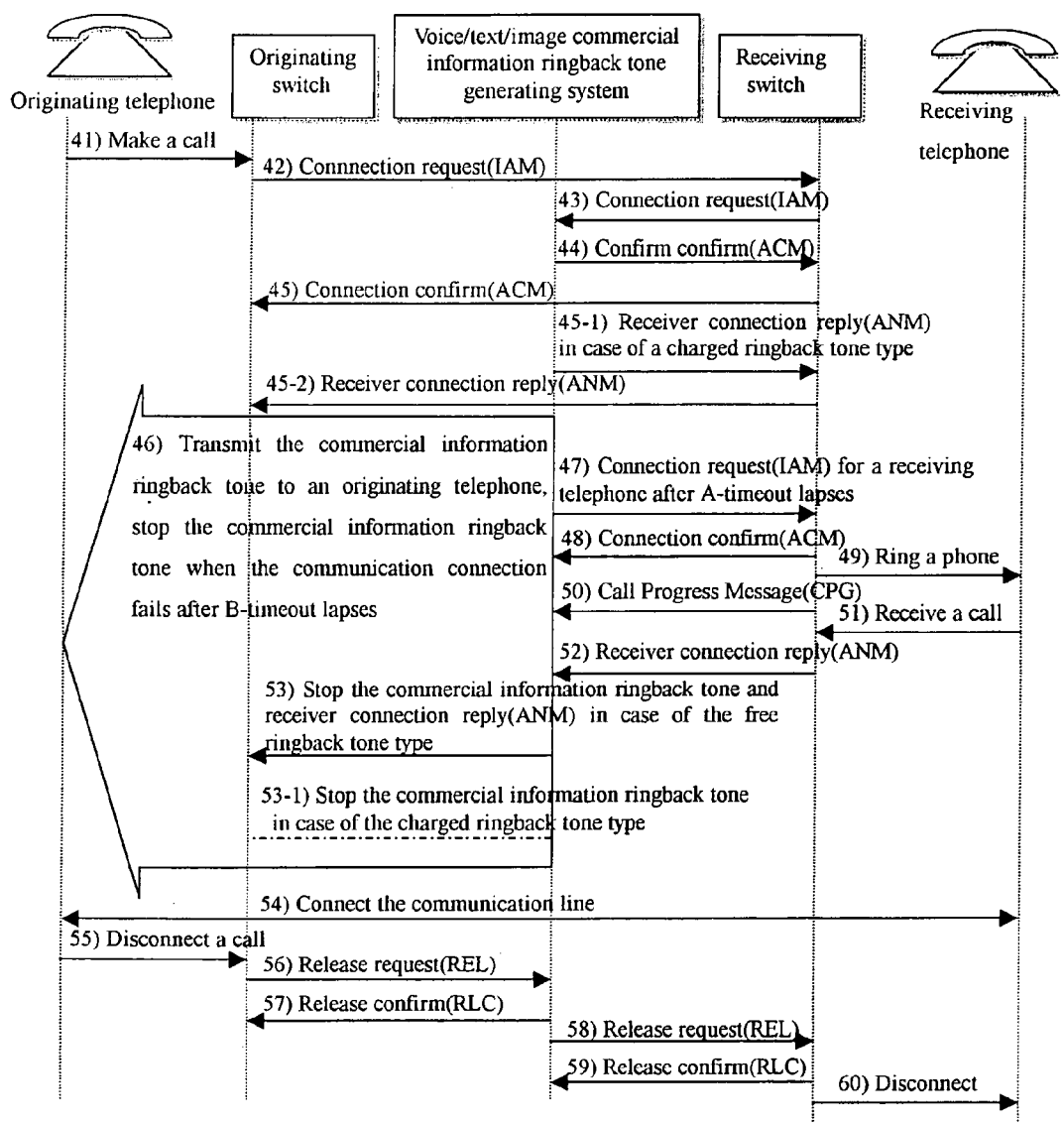
FIG. 9a shows a commercial information ringback tone generating procedure in case where the commercial information ringback tone generating system is utilized as a toll station at the receiving switch system according to a third embodiment of the invention.

FIG. 9a shows a procedure for generating the commercial information ringback tone in a case where the commercial information ringback tone generating system is utilized as a toll station outside of the receiving switch system according to a third embodiment of the present invention.

The third embodiment includes the steps of: making a call the originating telephone to the originating switch system (41), requesting a connection to the receiving switch system by sending an initial address message(IAM) from the originating switch system (42), requesting a connection to the commercial information ringback tone generating system by sending an initial address message(IAM) from the receiving switch system (43), confirming the connection from the commercial information ringback tone generating device to the receiving switch system by sending an address complete message(ACM) (44), confirming the connection to the originating switch system by sending an ACM from the receiving switch system (45), replying a connection to the receiving switch system from the commercial information ringback tone generating system by sending an answering message (ANM)(45-1), and replying a connection to the originating switch system from the receiving switch system by sending an answer message (ANM) (45-2).

The method further includes the steps of: transmitting the commercial information ringback tone to the originating telephone from the commercial information ringback tone generating system, and when the connection fails after the B-timeout lapses, stopping the commercial information ringback tone (46).

The method further includes the steps of: requesting a connection to the receiving switch system by sending an initial address message(IAM) from the commercial information ringback tone generating system after the first predetermined time(A-timeout) lapses since the beginning of the commercial information Ringback tone transmission (47), confirming the connection to the commercial information ringback tone generating system by sending an address complete message(ACM) from the receiving switch system (48), ringing the receiving telephone from the receiving switch system (49), sending a call progress message(CPG) from the receiving switch system to the commercial information ringback tone generating system (50), replying a receiver connection (52) to the commercial information ringback tone generating system by sending an answer message(ANM) from the receiving switch system when a receiver receives a call with the receiving telephone (52). The method further goes through the steps of: stopping the commercial information ringback tone to the originating switch system from the commercial information ringback tone generating system and replying a connection by sending an answer message (ANM) (53) in case of free ringback tone type, and stopping the commercial information ringback tone to the originating switch system from the commercial information ringback tone generating system in case of charged ringback tone type (53-1).

The method further includes the steps of: connecting a communication line between the originating telephone and the receiving telephone (54).

The method further includes the steps of: requesting a release (56) of the commercial information ringback tone to the commercial information ringback tone generating system from the originating switch system by sending a release message(REL) when the receiving telephone is disconnected from the originating switch system (55), and confirming the release to the originating switch system from the commercial information ringback tone generating system by sending a release complete message(RLC)(57).

The method further includes the steps of: requesting a release to the receiving switch system from the commercial information ringback tone generating system by sending a release message(REL)(58), confirming the release to the commercial information ringback tone generating system from the receiving switch system by sending a release complete message(RLC)(59), and finishing the communication by disconnecting the receiving telephone from the receiving switch system (60).

Figure 9B:
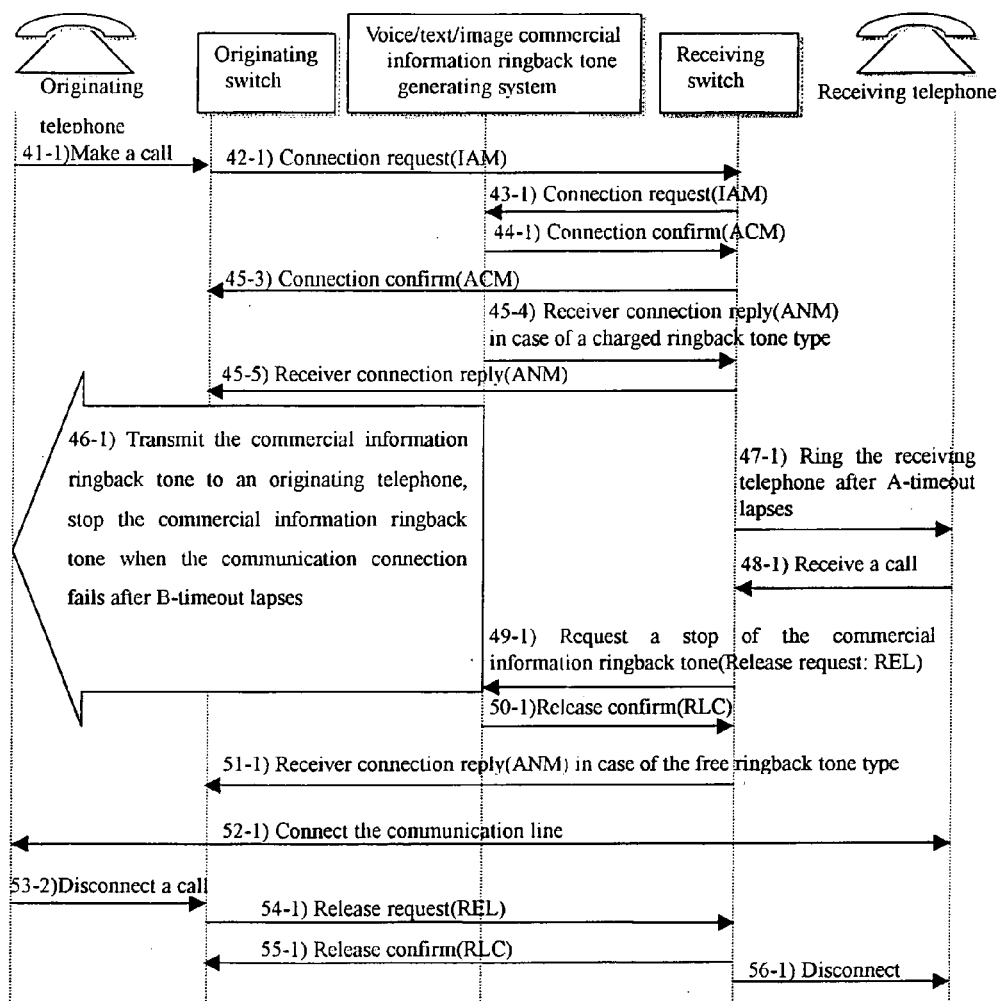
FIG. 9b shows a commercial information ringback tone generating procedure in case where the commercial information ringback tone generating system is set as an end station at the receiving switch system according to a third embodiment of the invention.

FIG. 9b shows a procedure for generating the commercial information ringback tone in a case where the commercial information ringback tone generating system is set as an end station outside of the receiving switch system according to the third embodiment of the present invention.

The method further comprises the steps of: making a call to the originating switch system by using the originating telephone (41-1), requesting a connection to the receiving switch system by sending an initial address(IAM) message from the originating switch system (42-1), requesting a connection to the commercial information ringback tone generating system by sending an initial address message (IAM) from the receiving switch system (43-1), confirming a connection from the commercial information ringback tone generating system to the receiving switch system by sending an address complete message(ACM)(44-1), confirming a connection from the receiving switch system to the originating switch system by sending an address complete message(ACM)(45-3).

The method further goes through the steps of: replying a receiver connection to the receiving switch system from the commercial information ringback tone generating system by sending an answer message(ANM)(45-4) in case of charged ringback tone type, and replying a receiver connection to the originating switch system from the receiving switch system by sending an answering message(ANM)(45-5).

The method further goes through the steps of: transmitting the commercial information ringback tone to the originating telephone from the commercial information ringback tone generating system, and when the connection fails after the B-timeout lapses, stopping the commercial information ringback tone (46-1).

The method further goes through the steps of: requesting a release and requesting a stop of the commercial information ringback tone to the commercial information ringback tone generating system from the receiving switch system (49-1) by sending a release message(REL) when the receiving telephone ringing (47-1) and a receiver receives a call with the receiving telephone (48-1) after the first predetermined time(A-timeout) lapses since the beginning of the commercial information ringback tone transmission.

The method further goes through the steps of: confirming a release to the receiving switch system by sending a release complete message(RLC) from the commercial information ringback tone generating system (50-1) and replying a receiver connection to the originating switch system by sending an answer message(ANM) from the receiving switch system in case of free ringback tone type (51-1).

The method further goes through the steps of: connecting the communication line between the originating telephone and the receiving telephone (52-1).

The method further goes through the steps of: requesting a release (54-1) to the receiving switch system from the originating switch system by sending a release message (REL) when the originating telephone is disconnected from the originating switch system (53-2), confirming the release to the originating switch system from the receiving switch system by sending a release complete message(RLC) (55-1), and finishing the communication by disconnecting the receiving telephone from the receiving switch system (56-1).

Figure 10:
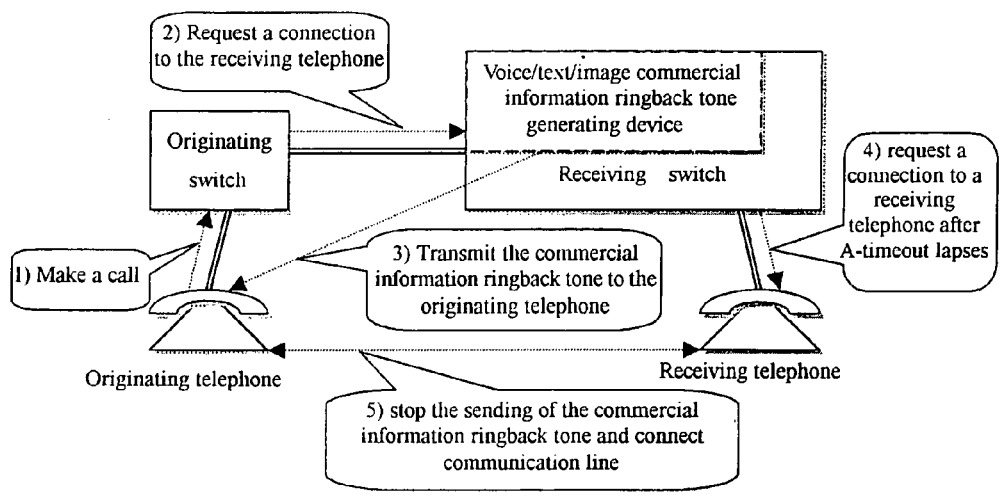
FIG. 10 is a system connection diagram using the commercial information ringback tone generating device in the receiving switch system.

FIG. 10 is a schematic diagram for illustrating a connection between systems using the commercial information ringback tone generating device in the receiving switch system.

Figure 11:
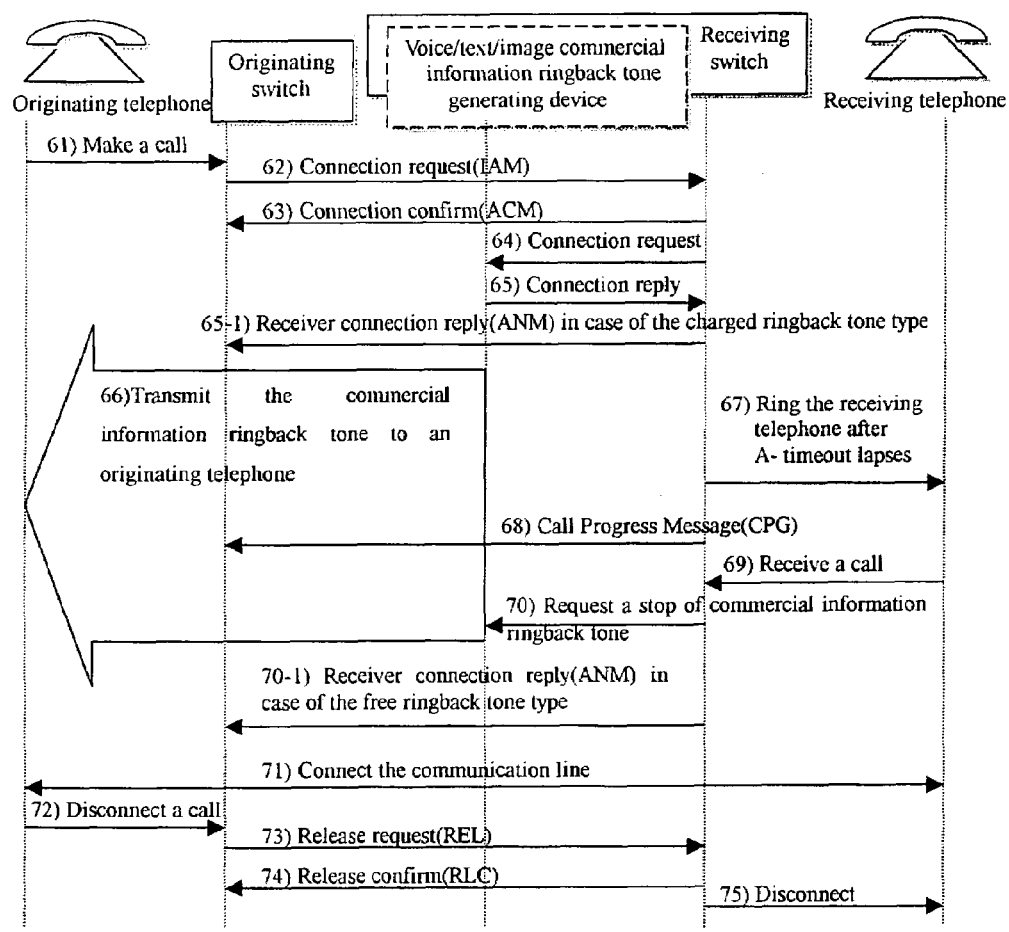
FIG. 11 shows a commercial information ringback tone generating procedure using the commercial information ringback tone generating device in the receiving switch system in accordance with a fourth embodiment of the invention.

FIG. 11 shows a procedure for generating the commercial information ringback tone in a case where the commercial information ringback tone generating system in the receiving switch system is adapted according to a fourth embodiment of the present invention.

The fourth embodiment includes the steps of: making a call to the originating switch system by using the originating telephone (61), requesting a connection to the receiving switch system by sending an initial address message from the originating switch system (62), confirming the connection to the originating switch system by sending an address complete message(ACM) from the receiving switch system (63), requesting a connection to the commercial information ringback tone generating device from the receiving switch system (64), replying the connection to the receiving switch system from the commercial information ringback tone generating device (65), and answering a connection to the originating switch system from the receiving switch system by sending an answer message(ANM)(65-1) in case of charged ringback tone type.

The method further includes the steps of: transmitting the commercial information ringback tone to the originating telephone from the commercial information ringback tone generating system in the receiving switch system (66).

The method further includes the steps of: sending a call progress message(CPG) (68) to the originating switch system from the receiving switch system when the receiving telephone rings (67) after the first predetermined time(A-timeout) lapses since the beginning of the commercial information ringback tone transmission, requesting a stop of the commercial information ringback tone to the commercial information ringback tone generating device from the receiving switch system (70) when a receiver receives a call with the receiving telephone (69). The method further includes the steps of: replying a receiver connection to the originating switch system from the receiving switch system by sending an answer message(ANM) in case of free ringback tone type (70-1).

The method further includes the steps of: connecting the communication line between the originating telephone and receiving telephone (71), requesting a release (73) to the receiving switch system from the originating switch system by sending a release message(REL) when the originating telephone is disconnected from the originating switch system (72), confirming the release to the originating switch system from the receiving switch system by sending a release complete message(RLC)(74), and finishing the communication by disconnecting the receiving telephone from the receiving switch system (75).

Figure 12:
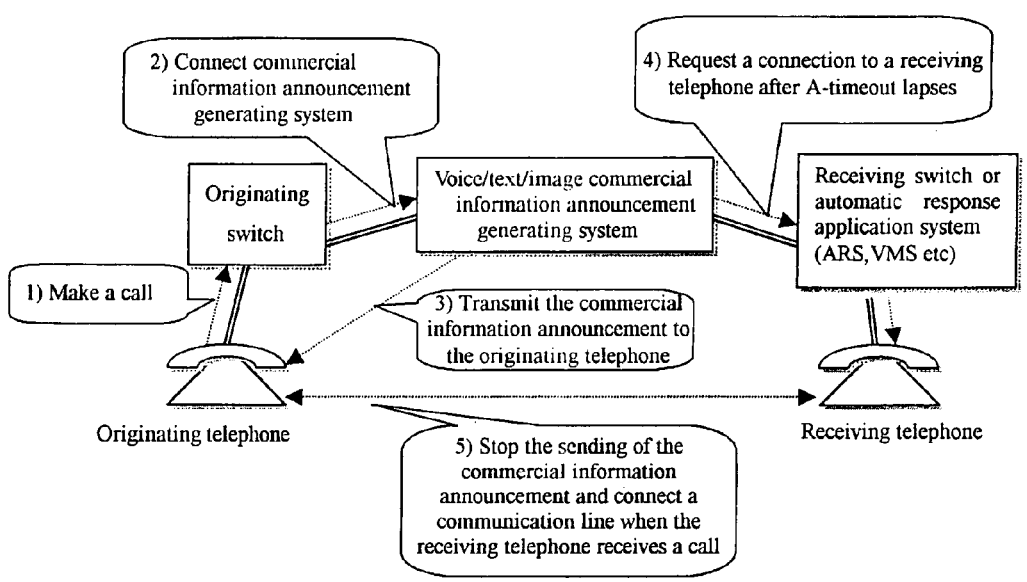
FIG. 12 is a connection diagram between systems using a commercial information announcement generating system.

FIG. 12 is a schematic diagram for illustrating a connection between systems using the commercial information announcement generating system.

Figure 13:
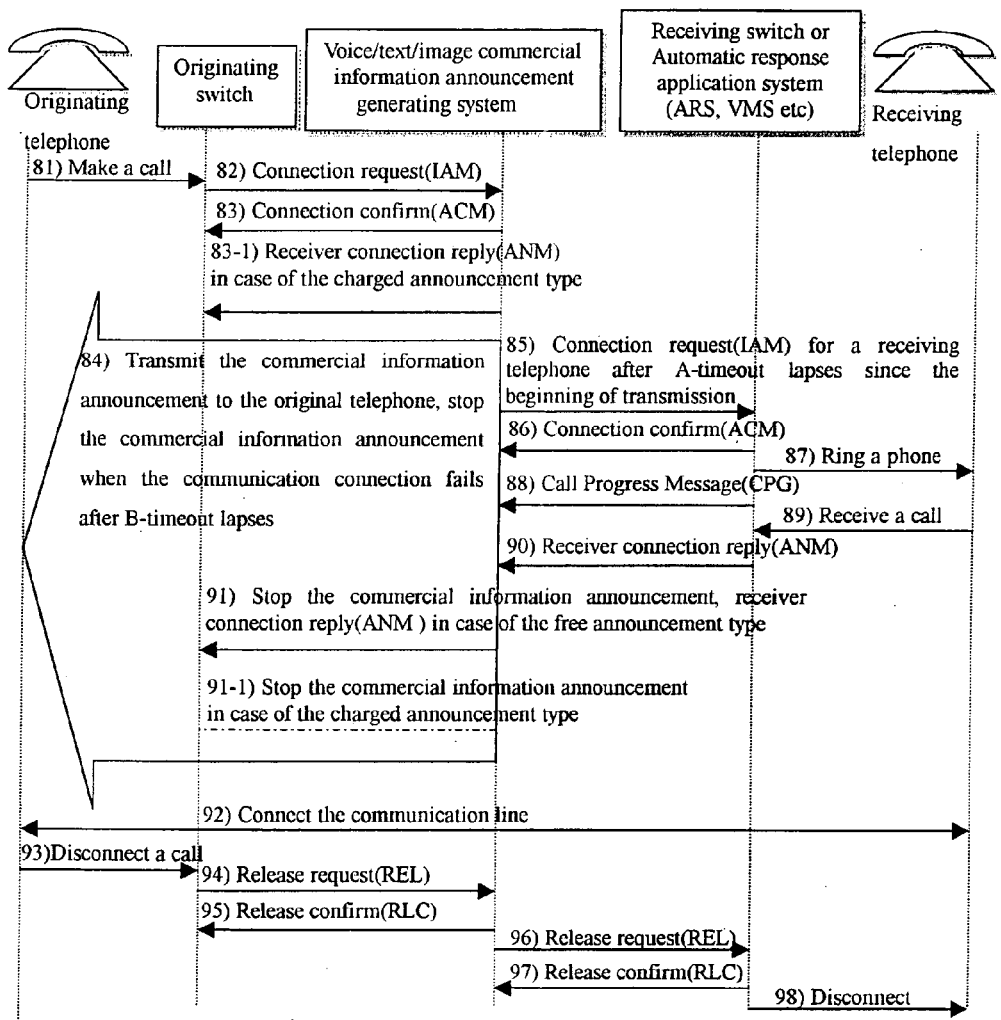
FIG. 13 shows a commercial information announcement generating procedure using a commercial information announcement generating system according to a fifth embodiment of the invention.

FIG. 13 shows a procedure for generating the commercial information announcement using the commercial information announcement generating system according to a fifth embodiment of the present invention.

The fifth embodiment includes the steps of: requesting a connection (82) to the commercial information announcement generating system from the originating switch system by sending an initial address message(IAM) when the originating telephone makes a call to the originating switch system (81), confirming the connection to the originating switch system by sending an address complete message (ACM) from the commercial information announcement generating system (83), and replying a receiver connection to the originating switch system by sending an answer message(ANM) from the commercial information announcement generating system in case of charged announcement type (83-1).

The method further includes the steps of: transmitting the commercial information announcement(advertisement, music, news, stock, weather, fortune and so on) from the commercial information announcement generating system to the originating telephone and stopping the commercial information announcement when the communication connection fails after the second predetermined time(B-timeout) lapses (84).

The method further includes the steps of: requesting a connection (85) to the receiving switch system or an automatic response application system(ARS, VMS etc) from the commercial information announcement generating system by sending an initial address message(IAM) after the first predetermined time(A-timeout) lapses since the beginning of the commercial information announcement transmission, confirming the connection to the commercial information announcement generating system by sending an address complete message(ACM) from the receiving switch system (86), sending a call progress message(CPG) to the commercial information announcement generating system from the receiving switch system or the automatic response application system (88) after the receiving telephone rings (87), and when a receiver receives a call with the receiving telephone (89), replying a receiver connection to the commercial information announcement generating system from the receiving switch system or the automatic response application system (90).

The method further includes the steps of: replying a receiver connection to the originating switch system from the commercial information announcement generating system by stopping the commercial information announcement and sending an answer message(ANM) in case of free of charge announcement type (91), stopping the commercial information announcement in case of charged announcement type (91-1).

The method further includes the steps of: connecting the communication line between the originating telephone and the receiving telephone (92).

The method further includes the steps of: requesting a release (94) to the commercial information announcement generating system from the originating switch system by sending a release message(REL) when the originating telephone is disconnected from the originating switch system (93), confirming the release to the originating switch system from the commercial information announcement generating system by sending a release complete message (RLC)(95).

The method further includes the steps of: requesting a release to the receiving switch system or the automatic response application system by sending a release message (REL) from the commercial information announcement generating system (96), confirming the release to the commercial information announcement generating system from the receiving switch system by sending a release complete message(RLC)(97), and finishing the communication by disconnecting the receiving telephone from the receiving switch system or the automatic response application system (98).

Figure 14:
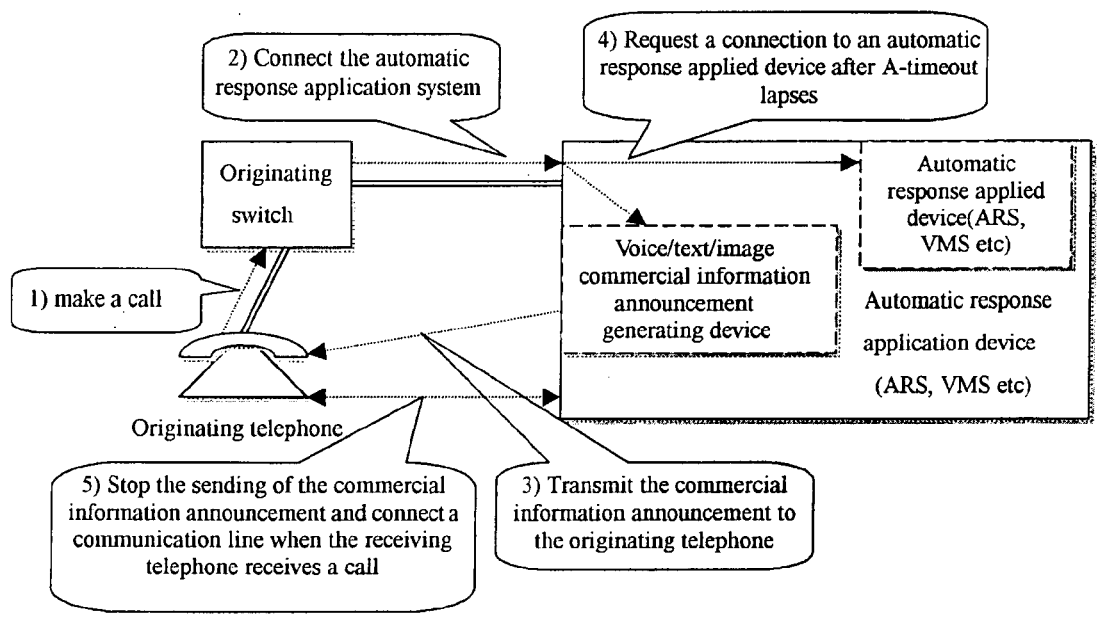
FIG. 14 is a connection diagram between systems using a commercial information announcement generating device of an automatic response application system such as ARS, VMS, VISS(Voice Information Service System), PPS(Pre-Paid System) etc.

FIG. 14 is a schematic diagram for illustrating a connection between systems using the commercial information announcement generating system of an automatic response application system. The automatic response application system includes an ARS(Automatic Response system), a VISS (Voice Information Service System), PPS(PrePaid System) etc. The commercial information announcement includes advertisements, music, news, stock, weather etc.

Figure 15:
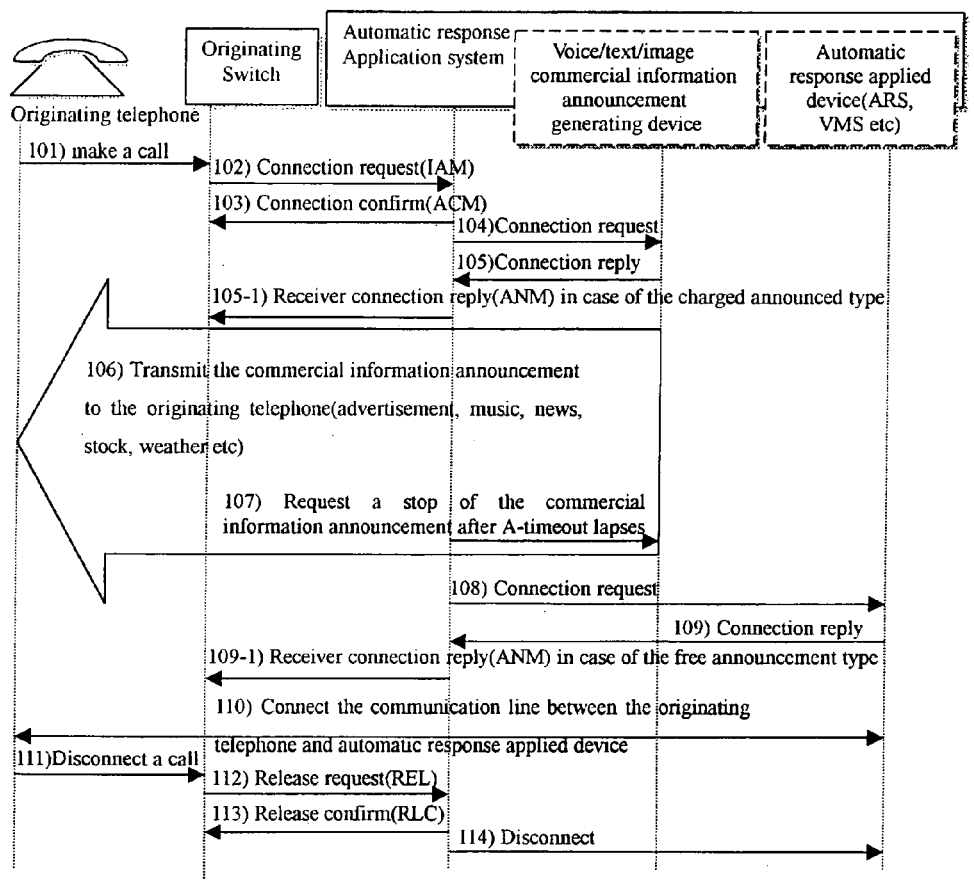
FIG. 15 shows a commercial information announcement generating procedure using a commercial information announcement generating device in accordance with a sixth embodiment of the invention.

FIG. 15 shows a procedure for generating the commercial information announcement using the commercial information announcement generating device of the automatic response application system according to a sixth embodiment of the invention.

Referring to FIG. 15, the commercial information announcement is generated by using the commercial information announcement generating device of the automatic response application system including a voice/text/image commercial information announcement device and an automatic response applied device.

The sixth embodiment includes the steps of: requesting a connection (102) to the automatic response application system from the originating switch system by sending an initial address message(IAM) when the originating telephone makes a call to the originating switch system (101), confirming the connection to the originating switch system by sending an address complete message(ACM) from the automatic response application system (103), requesting a connection to the commercial information announcement generating device from the automatic response application system (104), replying a connection to the automatic response application system from the commercial information announcement generating device (105), and replying a receiver connection to the originating switch system by sending an answer message from the automatic response application system in case of charged announcement type (105-1).

The method further goes through the steps of: transmitting the commercial information announcement from the commercial information announcement generating device to the originating telephone (106) and requesting a stop of the commercial information announcement after the first predetermined time(A-timeout) lapses (107).

The method further goes through the steps of: requesting a connection to an automatic response applied device from the automatic response application system (108), replying a connection to the automatic response applied system from the automatic response applied device (109), and replying a receiver connection to the originating switch system by sending an answer message(ANM) from the automatic response application system in case of free announcement type (109-1).

The method further goes through the steps of: connecting a communication line between the originating telephone and the automatic response applied device (110).

The method further goes through the steps of: requesting a release (112) to the automatic response application system from the originating switch system by sending a release message(REL) when the originating telephone is disconnected from the originating switch system (111), confirming the release to the originating switch system from the automatic response application system by sending a release complete message (RLC) (113), and disconnecting the automatic response applied device from the automatic response application system (114).

Figure 16:
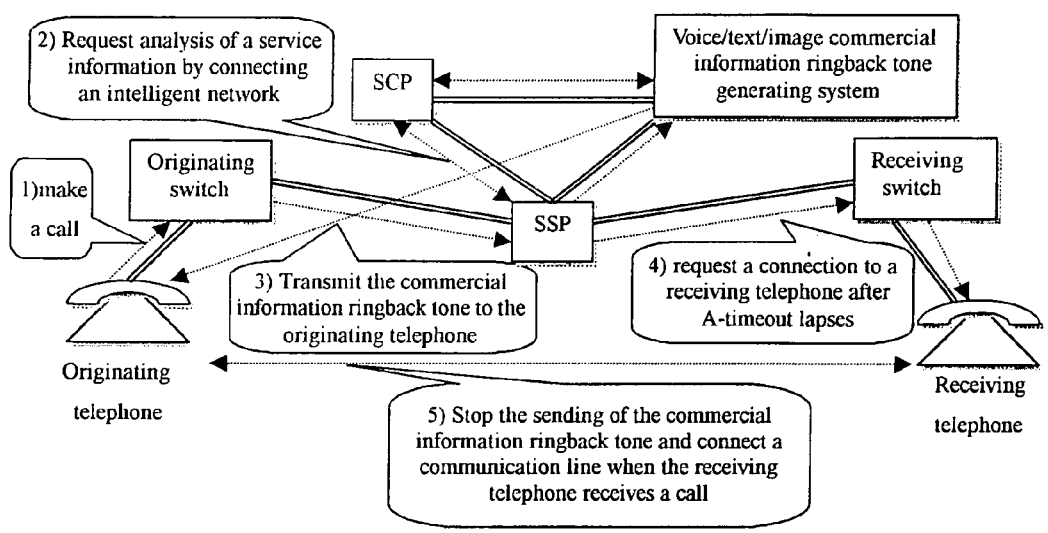
FIG. 16 is a connection diagram between systems using the commercial information Ringback tone generating device on an intelligent network.

FIG. 16 is a schematic diagram for illustrating a connection between systems using the commercial information ringback tone generating system on an intelligent network.

Figure 17:
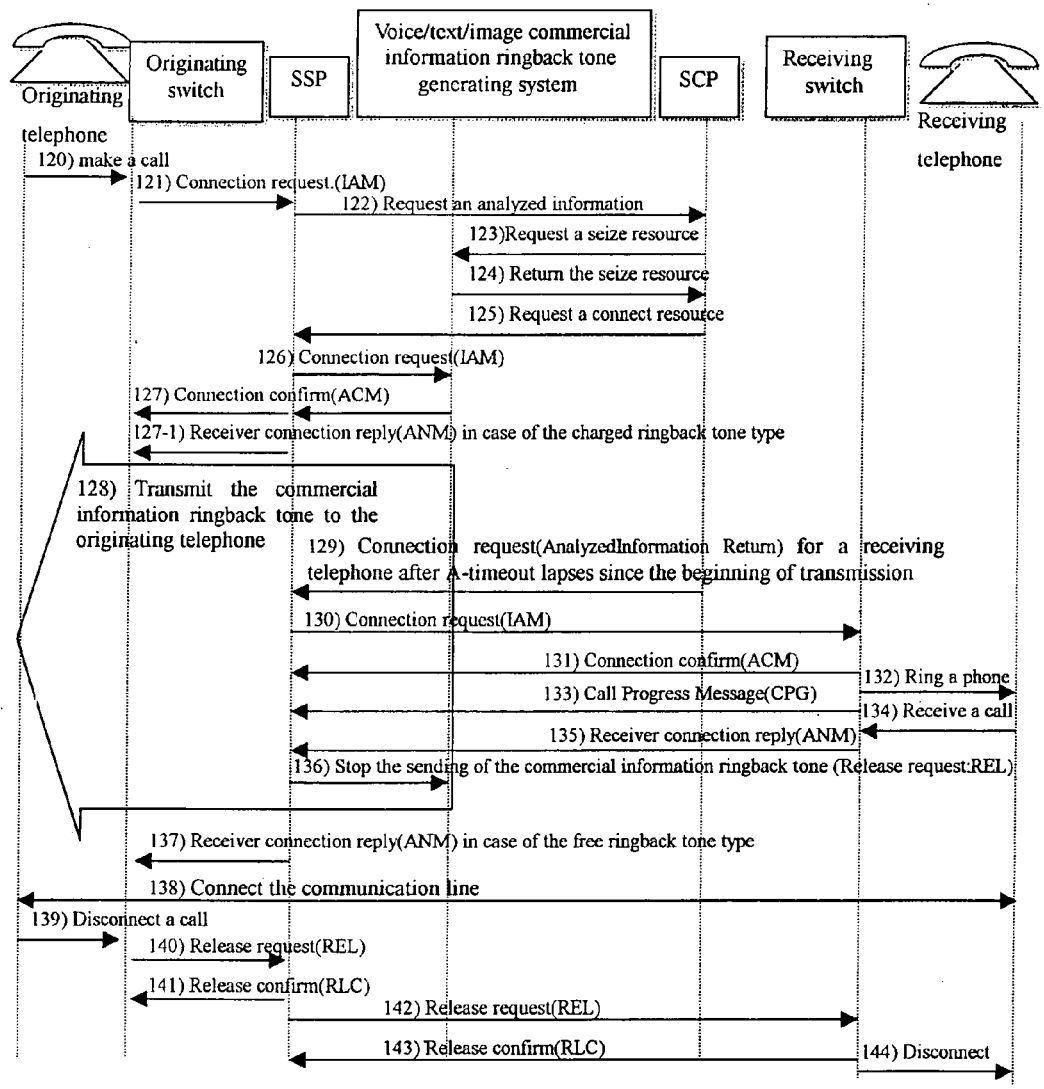
FIG. 17 shows a commercial information ringback tone generating procedure using the commercial information ringback tone generating system on the intelligent network according to a seventh embodiment of the invention.

FIG. 17 shows a procedure for generating the commercial information ringback tone using the commercial information ringback tone generating system on the intelligent network according to a seventh embodiment of the present invention.

The seventh embodiment includes the steps of: making a call the originating telephone to the originating switch system (120), requesting a connection to a service switching point(SSP) by sending an initial address message(IAM) from the originating switch system (121), requesting an analyzed information to a service control point(SCP) from the service switching point(SSP)(122), requesting a seize resource to the commercial information ringback tone generating system from the service control point(SCP) (123), returning the seize resource to the service control point from the commercial information ringback tone generating system (124), requesting a connect resource to the service switching point from the service control point (125), and requesting a connection to the commercial information ringback tone generating system by sending an initial address message(IAM) from the service switching point (126).

The method further goes through the steps of: confirming the connection to the originating switch system from the commercial information ringback tone generating system through the service switching point by sending an address complete message(ACM) (127), and answering a receiver connection to the originating switch system by sending an answer message from the service switching point in case of the charged ringback tone type (127-1).

The method further goes through the steps of: transmitting a commercial information ringback tone(advertisement, music, news, stock, weather, fortune etc) to the originating telephone from the commercial information ringback tone generating system (128).

The method further goes through the steps of: requesting an analyzed information return to the service switching point from the service control point after the first predetermined time(A-timeout) lapses since the beginning of the commercial information ringback tone transmission (129), requesting a connection to the receiving switch system by sending an initial address message from the service switching point (130), confirming the connection to the service switching point by sending an address complete message(ACM) from the receiving switch system (131), ringing the receiving telephone by the receiving switch system (132), sending a call progress message(CPG) to the service switching point from the receiving switch system (133). When a receiver receives a call with the receiving phone (134), the method goes through the steps of: replying a receiver connection (135) to the service switching point by sending an answer message(ANM) from the receiving switch system, and stopping the commercial information ringback tone by sending a release message(REL) to the commercial information ringback tone generating system from the service switching point (136).

The method further goes through the steps of: replying a receiver connection to the originating switch system by sending an answer message(ANM) from the service switching point in case of free ringback tone type (137).

The method further goes through the steps of: connecting a communication line between the originating telephone and the receiving telephone (138).

The method further goes through the steps of: requesting a release (140) to the service switching point from the originating switch system by sending a release message (REL) when the originating telephone is disconnected from the originating switch system (139), and confirming the release to the originating switch system from the service switching point by sending a release complete message (RLC)(141).

The method further goes through the steps of: requesting a release to the receiving switch system from the service switching point by sending a release message(REL)(142), confirming the release to the service switching point from the receiving switch system by sending a release complete message(RLC)(143), and finishing the communication by disconnecting the receiving telephone from the receiving switch system (144).

When the SSP is utilized as an end switch, it works together with a voice communication switch device through interstation signal protocol(No. 7, ISUP, R2MFC and so on), or when the SSP is utilized as a local switch, it works together with a voice communication switch device through IPC(Inter-Process Communication).

Figure 18:
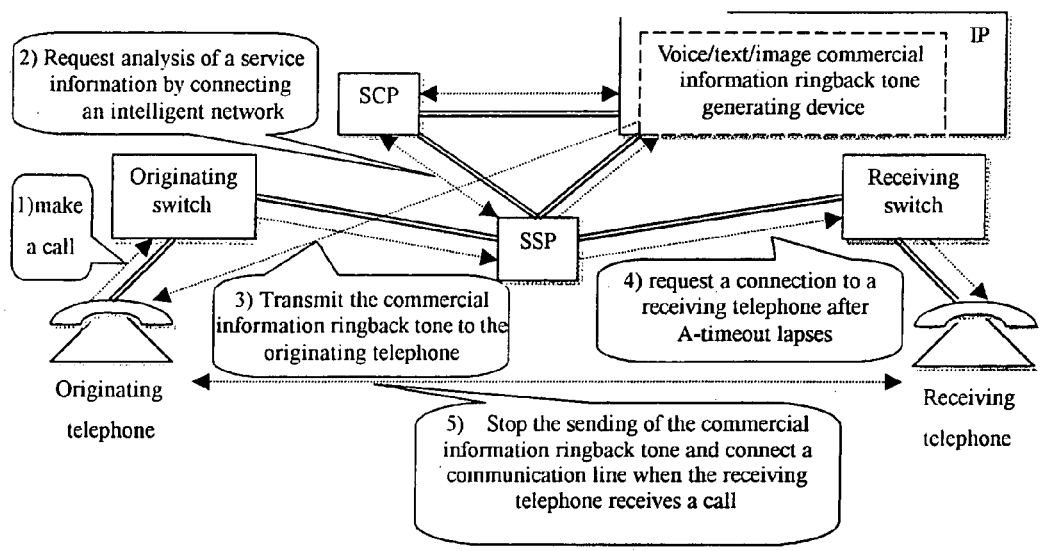
FIG. 18 is a connection diagram between systems using a commercial information ringback tone generating device of an Intelligent Peripheral on the intelligent network.

FIG. 18 is a schematic diagram for illustrating a connection between systems using the commercial information ringback tone generating device in an IP(Intelligent Peripheral) on the intelligent network.

Figure 19:
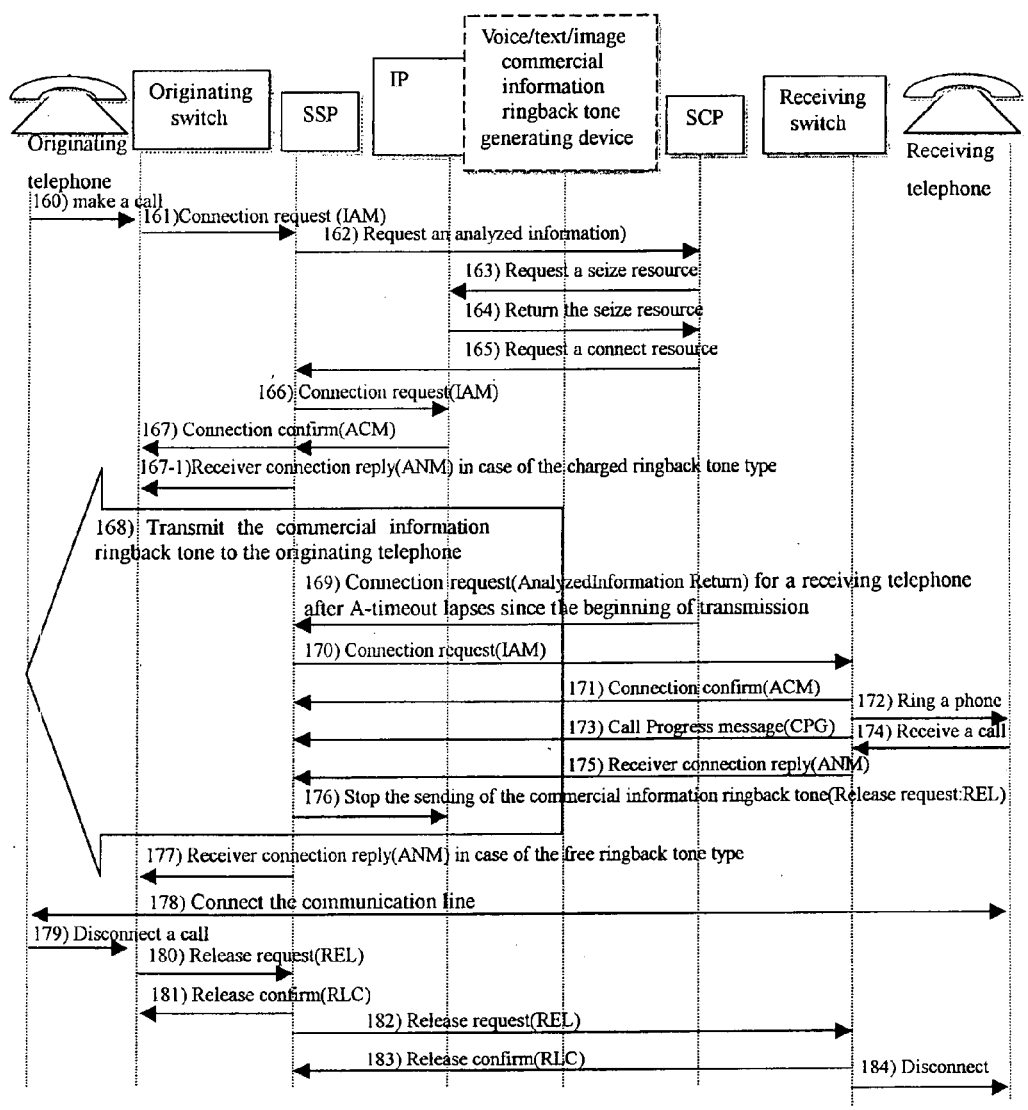
FIG. 19 shows a commercial information ringback tone generating procedure using a commercial information ringback tone generating device of the Intelligent Peripheral on the intelligent network according to a eighth embodiment of the invention.

FIG. 19 shows a procedure for generating the commercial information ringback tone using the commercial information ringback tone generating device in the IP on the intelligent network according to an eighth embodiment of the invention.

The eighth embodiment includes the steps of: connecting the originating telephone to the originating switch system (160), requesting a connection to a service switching point by sending an initial address message(IAM) from the originating switch system (161), requesting an analyzed information to a service control point(SCP) from the service switching point(SSP)(162), requesting a seize resource to the intelligent peripheral from the service control point (163), returning the seize resource to the service control point from the intelligent peripheral (164), requesting a connect resource to the service switching point from the service control point (165), and requesting a connection to the intelligent peripheral by sending an initial address message(IAM) from the service switching point (166).

The method further goes through the steps of: confirming the connection to the originating switch system from the intelligent peripheral through the service switching point by sending an address complete message(ACM)(167), and answering a receiver connection to the originating switch system by sending an answer message(ANM) from the service switching point in case of charged ringback tone type (167-1).

The method further goes through the steps of: transmitting a commercial information Ringback tone to the originating telephone from the commercial information ringback tone generating system (168).

The method further goes through the steps of: requesting an analyzed information return to the receiving telephone after the first predetermined time(A-timeout) lapses since the beginning of the commercial information ringback tone transmission (169), requesting a connection to the receiving switch system by sending an initial address message from the service switching point (170), confirming the connection to the service switching point by sending an address complete message from the receiving switch system (171), ringing the receiving telephone by the receiving switch system (172), sending a call progress message to the service switching point from the receiving switch system (173). When a receiver operates the receiving phone (174), the method goes on the steps of: answering a receiver connection to the service switching point from the receiving switch system by sending an answer message (175) and stopping the commercial information ringback tone by sending a release message to the intelligent peripheral from the service switching point (176).

The method further goes through the steps of: answering a receiver connection to the originating switch system by sending an answer message from the service switching point in case of free of charge ringback tone type (177).

The method further goes through the steps of: connecting a communication line between the originating and the receiving telephones (178).

The method further goes through the steps of: requesting a release to the service switching point from the originating switch system by sending a release message(REL)(180) when the originating telephone is disconnected from the originating switch system (179), and confirming the release to the originating switch system from the service switching point by sending a release complete message(RLC)(181).

The method further goes through the steps of: requesting a release to the receiving switch system from the service switching point by sending a release message(REL) (182), confirming the release to the service switching point from the receiving switch system by sending a release complete message(RLC)(183), and finishing the communication by disconnecting the receiving telephone from the receiving switch system (184).

Although the present invention is explained by using the No. 7 ISUP(ISDN User Part) among the inter-station signal protocols, various signal protocols such as R2MFC, X. 25, TCP/IP, IPC and so on. (FIGS. 5a, 5b, 7, 9a, 9b, 11, 13, 15, 17 and 19)

This invention makes a subscriber to hear the commercial information instead of the ringback tone and provides any kinds of charge discount. Thus, the subscriber can hear the music, musical advertisement, news, stock information instead of the boring ringback tone from the switch system during a communication wait.

In general, a caller can communicate with the receiver through a communication network by the ordinary telephones or mobile telephones. At this time, the commercial information such as advertisement, music, news, stock information instead of the ringback tone are generated and started from the time until the calling signal arrives on the receiver.

Recently, the corded telephone, the cordless telephone, auxiliary services such as ARS, VMS, VISS and PPS, and the telephone number help service are kinds of charged communication. However, when the invention is adapted, the communication charge discount or free of charge schedule can be given to the subscriber.

On the other hand, on the communication manage company' side, he can get a fee from the advertisement provider and can provide the charged commercial information such as news, stock evaluations, music or the like so that an auxiliary benefit can be obtained and can be given a benefit users, communication company and advertisement provider by decreasing a communication fee.

The commercial information providing method according to the present invention can be adapted to communications between ordinary telephone, guide telephone, video telephone, mobile telephone, internet telephone, satellite telephone, or to the auxiliary services such as VMS, VISS or PPS(PrePaid Service).

Especially, in the case of the help service, the caller can wait while hearing the commercial information with music before he or she is connected to the counsellor.

In the case of the VMS(Voice Mailing Service), the subscriber can get through the voice mail box without any charge.

Communication connection methods includes those methods to call an ordinary phone number, to call the ordinary phone number by a pre-registered subscriber, and to call a special phone number, and system constructions for generating the commercial information ringback tone includes a device built-in-switch, a system built-out-switch and an intelligent network type, and protocols for connecting the commercial information ringback tone generating device, commercial information ringback tone generating system and the switch systems includes No. 7 ISUP, R2MFC, IPC, X.25, TCP/IP, and subscriber's information are classified into gender, age, region, time band, and earning.

INDUSTRIAL APPLICABILITY

As described above, the commercial information ringback tone generating method(a ringback service) and device according to the present invention can provide commercial information such as advertisement, music, news, stock information during a communication wait to the caller instead of the ordinary ringback tone so that the subscriber can relax a boring state, save the communication charge and hear the commercial information in forms of voice, text or image, and the communication company can get an additional benefit from providing the commercial information not only the communication charge even when the connection is failed, and finally the advertisement company can maximize the advertisement effect.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for generating voice/text/image commercial information through a communication system including a call process function carrying out a transfer of a commercial information to an originating telephone instead of a ringback tone or a guide message during a communication wait till a receiving side is received after the calling from the originating telephone of a subscriber to a receiving side is completed, the method comprising the steps of:

(a) checking a telephone call, connecting with an information generating system at an originating or a receiving communication system when the call is detected, beginning to transmit a commercial information instead of the original ringback tone or the guide message to an originating side telephone from the information generating system in at least one form of a voice, a text, and/or an image during a communication wait, requesting a connection to a receiving telephone from the information generating system after a first predetermined time lapses, and continuously transmitting the commercial information to the originating telephone;

(b) checking whether the receiving telephone accepts the connection request, checking whether a second predetermined time lapses since the commercial information is provided if the connection request is not accepted, checking whether a telephone connection fails if within the second predetermined time and continuously providing the commercial information to the originating telephone if the telephone connection does not fail;

(c) stopping the providing of the commercial information if the telephone connection is made, connecting a communication line between the originating telephone and the receiving telephone, checking whether the communication is finished, and disconnecting the communication line if the communication finishes;

(d) stopping the sending of the commercial information if the second predetermined time lapses, and connecting a relay line between an originating switch system and a receiving switch system; and (e) stopping the sending of the commercial information if the connection request fails, releasing the relay line between the originating switch and the receiving switch, checking whether a next connection request is pending, and beginning to transmit the commercial information to the originating telephone from the information generating system if pending.

2. The method as recited in claim 1, further comprising the steps of requesting the connection to the receiving telephone after the first predetermined time, stopping the sending of the commercial information and beginning to transmit an original ringback tone or the guide message to the originating telephone when a ringback tone hearing mode is set, checking whether the receiving telephone accepts the request, stopping the providing of the commercial information or the guide message if the request is accepted, connecting the communication line between the originating telephone and the receiving telephone, checking whether the communication is finished, and disconnecting the communication line between the originating telephone and receiving telephone.

3. The method, as recited in claim 1, wherein in the step (a), when a subscriber calls a receiver's phone number by using an ordinary telephone, a mobile telephone including any one of CDMA, PCS, TDMA, GSM, AMPS and IMT-2000 type telephones, a video telephone, a satellite telephone and an internet telephone, when a pre-registered subscriber calls the receiver's phone number by using the receiver's phone number, when a subscriber calls a special number, or a subscriber calls an automatic response application system, the commercial information providing service sends the commercial information in forms of melody, advertisement or advertisement image to the originating telephone in at least one form of a voice like melody, a text like advertisement, and/or an image like advertisement image during a communication wait.

4. The method as recited in claim 1, further comprising the steps of:
in case where the information generating system is used as a toll station in the originating switch system,
requesting a connection to the information generating system by sending an initial address message (IAM) from the originating switch system when the originating telephone makes a call to the originating switch system, confirming the connection from the information generating system by sending an address complete message (ACM) to the originating switch system, replying a receiver connection by sending an answer message (ANM) from the information generating system to the originating switch system if a charged ringback tone type is set, transmitting the commercial information from the commercial information ringback tone information generating system to the originating telephone, stopping the commercial information when the communication connection fails after the second predetermined time lapses;
requesting a connection for a receiving telephone to a receiving switch system from the information generating system by sending the initial address message (IAM) after the first predetermined time lapses since the beginning of the commercial transmission, confirming the connection from the receiving switch system by sending the address complete message (ACM) to the information generating system, ringing the receiving telephone from the receiving switch system, sending a call progress message (CPG) from the receiving switch system to the information ringback tone information generating system, answering a receiving telephone connection to the information generating system from the receiving switch system by sending an answer message (ANM) when a receiver receives a call with the receiving telephone, answering the receiving telephone connection to the originating switch system from the information generating system by stopping the sending of the commercial information and replying a receiver connection by sending the answer message in case of free ringback tone type, and stopping the sending of the commercial information to the originating switch system from the information generating system in case of the charged ringback tone type;
connecting the communication line between the originating telephone and the receiving telephone; and
requesting a release to the information generating system from the originating switch system by sending a release message (REL) when the originator disconnects the communication, conforming the release to the originating switch system from the information generating system by sending a release complete message (RLC), requesting a release to the receiving switch system from the information generating system by sending a release message (REL), confirming the release to the information generating system from the receiving switch system by sending a release complete message (RLC), and finishing the communication by disconnecting the receiving telephone from the receiving switch system.

5. The method as recited in claim 1, further comprising the steps of:
in a case where the information generating system is used as an end station in the originating switch system,
requesting a connection to the information generating system by sending an initial address message (IAM) from the originating switch system when the originating telephone makes a call to the originating switch system, confirming the connection from the information generating system by sending an address complete message (ACM) to the originating switch system,
replying a receiver connection from the information generating system to the originating switch system by sending an answer message (ANM) in case of a charged ringback tone type:
transmitting the commercial information from the information generating system to the originating telephone, stopping the commercial information when the communication connection fails after the second predetermined time lapses;
requesting a connection for a receiving telephone to a receiving switch system from the originating switch system by sending the initial address message (IAM) after the first predetermined time lapses since the beginning of the commercial information transmission, confirming the connection from the receiving switch system by sending the address complete message (ACM) to the originating switch system, ringing the receiving telephone from the receiving switch system, sending a call progress message (CPG) from the receiving switch system to the originating switch system replying a receiving telephone connection to the originating switch system from the receiving switch system by sending an answer message (ANM) when a receiver receives a call with the receiving telephone, and requesting a stop of the commercial information from the originating switch system by sending a release message to the information generating system;
confirming the release to the originating switch system from the information generating system by sending a release complete message (RLC);
connecting the communication line between the originating telephone and the receiving telephone; and
requesting a release to the receiving switch system from the originating switch system by sending a release message (REL) when the originator disconnects the communication, confirming the release to the originating switch system from the receiving switch system by sending a release complete message (RLC), and finishing the communication by disconnecting the receiving telephone from the receiving switch system.

6. The method as recited in claim 1, further comprising the steps of:
in a case where the information generating system in the originating switch system is used so as to generate commercial information making a call to the originating switch system by using the originating telephone, requesting a connection to the information generating system from the originating switch system, and replying the connection from the information generating system to the originating switch system;
transmitting the commercial information to the originating telephone from the information generating system and when the connection fails after the second predetermined time lapses, stopping the commercial information;
requesting a connection to the receiving switch system by sending an initial address message (IAM) from the originating switch system after a first predetermined time lapses since the beginning of the commercial information transmission, confirming the connection to the originating switch system by sending an address complete message (ACM) from the receiving switch system, ringing the receiving telephone from the receiving switch system, sending a call progress message (CPG) from the receiving switch system to the originating switch system, replying a receiver connection to the originating switch system by sending an answer message (ANM) from the receiving switch system when a receiver receives a call with the receiving telephone, and requesting a release of the commercial information to the information generating system from the originating switch system;

connecting a communication line between the originating telephone and the receiving telephone; and requesting a release to the receiving switch system from the originating switch system by sending a release message (REL) when the originating telephone is disconnected from the originating switch system, confirming the release to the originating switch system from the receiving switch system by sending a release complete message (RLC), and finishing the communication by disconnecting the receiving telephone from the receiving switch system.

7. The method as recited in claim 1, further comprising the steps of:

in a case where the information generating system outside of the receiving switch system is used so as to generate commercial information, making a call to the originating switch system by using the originating telephone, requesting a connection to the receiving switch system by sending an initial address message (IAM) from the originating switch system, requesting a connection to the information generating system by sending an initial address message (IAM) from the receiving switch system, confirming the connection from the information generating system to the receiving switch system by sending an address complete message (ACM), confirming the connection to the originating switch system by sending an ACM from the receiving switch system, replying a connection to the receiving switch system from the information generating system by sending an answer message (ANM), and replying a connection to the originating switch system from the receiving switch system by sending an answer message (ANM);

transmitting the commercial information to the originating telephone from the information generating system, and when the connection fails after the second predetermined time lapses, stopping the commercial information;

requesting a connection to the receiving switch system by sending an initial address message (IAM) from the information generating system after the first predetermined time lapses since the beginning of the commercial information transmission, confirming the connection to the information generating system by sending an address complete message (ACM) from the receiving switch system, ringing the receiving telephone from the receiving switch system, sending a call progress message (CPG) from the receiving switch system to the information generating system, replying a receiver connection to the information generating system by sending an answer message (ANM) from the receiving switch system when a receiver receives a call with the receiving telephone;

stopping the commercial information to the originating switch system from the information generating system and replying a connection by sending an answer message (ANM) in case of free ringback tone type, and stopping the commercial information to the originating switch system from the commercial information ringback tone information generating system in case of charged ringback tone type;

connecting a communication line between the originating telephone and the receiving telephone; and requesting a release of the commercial information to the information generating system from the originating switch system by sending a release message (REL) when the receiving telephone is disconnected from the originating switch system, confirming the release to the originating switch system from the information generating system by sending a release complete message (RLC), requesting a release to the receiving switch system from the information generating system by sending a release message (REL), confirming the release to the information generating system from the receiving switch system by sending a release complete message (RLC), and finishing the communication by disconnecting the receiving telephone from the receiving switch system.

8. The method as recited in claim 1, further comprising the steps of:

in a case where the information generating system is set as an end station outside of the receiving switch system, making a call to the originating switch system by using the originating telephone, requesting a connection to the receiving switch system by sending an initial address message (IAM) from the originating switch system, requesting a connection to the information generating system by sending an initial address message (IAM) from the receiving switch system, confirming a connection from the information generating system to the receiving switch system by sending an address complete message (ACM), confirming a connection from the receiving switch system to the originating switch system by sending an address complete message (ACM), replying a receiver connection to the receiving switch system from the information generating system by sending an answer message (ANM) in case of charged ringback tone type, and replying a receiver connection to the originating switch system from the receiving switch system by sending an answer message (ANM);

transmitting the commercial information to the originating telephone from the information generating system, and when the connection fails after the second predetermined time lapses, stopping the commercial information;

requesting a release and requesting a stop of the commercial information to the information generating system from the receiving switch system by sending a release message (REL) when the receiving telephone ringing and a receiver receives a call with the receiving telephone after the first predetermined time lapses since the beginning of the commercial information transmission;

confirming a release to the receiving switch system by sending a release complete message (RLC) from, the information generating system and replying a receiver connection to the originating switch system by sending an answer message (ANM) from the receiving switch system in case of free ringback tone type;

connecting the communication line between the originating telephone and the receiving telephone; and requesting a release to the receiving switch system from the originating switch system by sending a release message (REL) when the originating telephone is disconnected from the originating switch system, confirming the release to the originating switch system from the receiving switch system by sending a release complete message (RLC), and finishing the communication by disconnecting the receiving telephone from the receiving switch system.

9. The method as recited in claim 1, further comprising the steps of:

in a case where the commercial information is generated through the information generating system in the receiving switch system;

making a call to the originating switch system by using the originating telephone, requesting a connection to the receiving switch system by sending an initial address message (IAM) from the originating switch system, confirming the connection to the originating switch system by sending an address complete message (ACM) from the receiving switch system, requesting a connection to the information generating system from the receiving switch system, replying the connection to the receiving switch system from the information generating system, and answering a connection to the originating switch system from the receiving switch system by sending an answer message (ANM) in case of charged ringback tone type;

transmitting the commercial information ringback tone to the originating telephone from the tone generating device information generating system in the receiving switch system; sending a call progress message (CPG) to the originating switch system from the receiving switch system when the receiving telephone rings by the receiving switch system after the first predetermined time lapses since the beginning of the commercial information transmission from the information generating system to the originating telephone, requesting a stop of the commercial information to the information generating system from the information generating system when a receiver receives a call with the receiving telephone;

replying a receiver connection to the originating switch system from the receiving switch system by sending an answer message (ANM) in case of free ringback tone type;

connecting the communication line between the originating telephone and the receiving telephone; and requesting a release to the receiving switch system from the originating switch system by sending a release message (REL) when the originating telephone is disconnected from the originating switch system, confirming the release to the originating switch system from the receiving switch system by sending a release complete message (RLC), and finishing the communication by disconnecting the receiving telephone from the receiving switch system.

10. The method as recited in claim 1, further comprising the steps of:

in a case where a commercial information announcement is provided by using commercial information announcement information generating system, requesting a connection to the commercial information announcement information generating system from the originating switch system by sending an initial address message (IAM) when the originating telephone makes a call to the originating switch system, confirming the connection to the originating switch system by sending an address complete message (ACM) from the commercial information announcement information generating system, and replying a receiver connection to the originating switch system by sending an answer message (ANM) from the commercial information announcement information generating system in case of charged announcement type;

transmitting the commercial information announcement from the commercial information announcement information generating system to the originating telephone and stopping the commercial information announcement when the communication connection fails after the second predetermined time lapses;

requesting a connection to the receiving switch system or an automatic response application system (ARS, VMS etc) from the commercial information announcement information generating system by sending an initial address message (IAM) after the first predetermined time lapses since the beginning of the commercial information transmission, confirming the connection to the commercial information announcement information generating system by sending an address complete message (ACM) from the receiving switch system or the automatic response application system, sending a call progress message (CPG) to the commercial information announcement information generating system from the receiving switch system or the automatic response application system after the receiving switch telephone rings by the receiving switch system the receiving telephone, and when a receiver makes a call with the receiving telephone, answering a receiver connection to the commercial information announcement information generating system from the receiving switch system or the automatic response application system;

replying a receiver connection to the originating switch system from the commercial information announcement information generating system by stopping the commercial information announcement and sending an answer message (ANM) in case of free of charge announcement type, stopping the commercial information announcement in case of charged announcement type;

connecting the communication line between the originating telephone and the receiving telephone; and requesting a release to the commercial information announcement information generating system from the originating switch system by sending a release message (REL) when the originating telephone is disconnected from the originating switch system, confirming the release to the originating switch system from the commercial information announcement information generating system by sending a release complete message (RLC), requesting a release to the receiving switch system or the automatic response application system by sending a release message (REL) from the commercial information announcement information generating system, confirming the release to the commercial information announcement information generating system from the receiving switch system or the automatic response application system by sending a release complete message (RLC), and finishing the communication by disconnecting the receiving telephone from the receiving switch system or the automatic response application system.

11. The method as recited in claim 1, further comprising the steps of:

in a case where a commercial information announcement is provided by using commercial information announcement generating device and an automatic response applied device in an automatic response application system, requesting a connection to the automatic response application system from the originating switch system by sending an initial address message (IAM) when the originating telephone makes a call to the originating switch system, confirming the connection to the originating switch system by sending an address complete message (ACM) from the automatic response application system, requesting a connection to the commercial information announcement generating device from the automatic response application system, replying a connection to the automatic response application system from the commercial information announcement generating device, and replying a receiver connection to the originating switch system by sending an answer message from the automatic response application system in case of charged announcement type;

transmitting the commercial information announcement from the commercial information announcement generating device to the originating telephone and requesting a stop of the commercial information announcement after the first predetermined time lapses;

requesting a connection to an automatic response applied device including ARS or VMS etc from the automatic response application system, replying a connection to the automatic response applied system from the automatic response applied device, and replying a receiver connection to the originating switch system by sending an answer message (ANM) from the automatic response application system in case of free of charge announcement type;

connecting a communication line between the originating telephone and the automatic response applied device; and requesting a release to the automatic response application system from the originating switch system by sending a release message (REL) when the originating telephone is disconnected from the originating switch system, confirming the release to the originating switch system from the automatic response application system by sending a release complete message (RLC), and disconnecting the automatic response applied device from the automatic response application system.

12. The method as recited in claim 1, further comprising the steps of:

in a case where the commercial information is generated by using the information generating system in an intelligent network;

making a call the originating telephone to the originating switch system, requesting a connection to a service switching point (SSP) by sending an initial address message(IAM) from the originating switch system, requesting an analyzed information to a service control point (SCP) from the service switching point, requesting a seize resource to the information generating system from the service control point, returning the seize resource to the service control point from the information generating system, requesting a connect resource to the service switching point from the service control point, and requesting a connection to the information generating system by sending an initial address message (IAM) from the service switching point;

confirming the connection to the originating switch system from the commercial information generating system through the service switching point by sending an address complete message (ACM), and answering a receiver connection to the originating switch system by sending an answer message from the service switching point in case of charged ringback tone type;

transmitting a commercial information to the originating telephone from the information generating system;

requesting an analyzed information return to the service switching point from the service control point after the first predetermined time lapses since the beginning of the commercial information transmission, requesting a connection to the receiving switch system by sending an initial address message (IAM) from the service switching point, confirming the connection to the service switching paint by sending an address complete message (ACM) from the receiving switch system, ringing the receiving telephone by the receiving switch system, sending a call progress message (CPG) to the service switching point from the receiving switch system, replying a receiver connection to the service switching point by sending an answer message (ANM) from the receiving switch system when a receiver receives a call with the receiving phone, and stopping the commercial information ringback tone by sending a release message (REL) to the information generating system from the service switching point;

replying a receiver connection to the originating switch system by sending an answer message (ANM) from the service switching point in case of free of charge ringback tone type;

connecting the originating telephone and the receiving telephone; and requesting a release to the service switching point from the originating switch system by sending a release message (REL) when the originating telephone is disconnected from the originating switch system, confirming the release to the originating switch system from the service switching point by sending a release complete message (RLC), requesting a release to the receiving switch system from the service switching point by sending a release message (REL), confirming the release to the service switching point from the receiving switch system by sending a release complete message (RLC), and finishing the communication by disconnecting the receiving telephone from the receiving switch system.

13. The method as recited in claim 1, further comprising the steps of:

in a case where the commercial information is generated by using the information generating system of the intelligent peripheral (IP) in an intelligent network, connecting the originating telephone to the originating switch system, requesting a connection to a service switching point by sending an initial address message (IAM) from the originating switch system, requesting an analyzed information to a service control point (SCP) from the service switching point (SSP), requesting a seize resource to the intelligent peripheral (IP) from the service control point, returning the seize resource to the service control point from the intelligent peripheral, requesting a connect resource to the service switching point from the service control point, and requesting a connection to the intelligent peripheral by sending an initial address message (IAM) from the service switching point;

confirming the connection to the originating switch system from the intelligent peripheral through the service switching point by sending an address complete message (ACM), and replying a receiver connection to the originating switch system by sending an answer message (ANM) from the service switching point in case of charged ringback tone type;

transmitting a commercial information to the originating telephone from the information generating system;

requesting an analyzed information return to the receiving telephone after the first predetermined time lapses since the beginning of the commercial information transmission, requesting a connection to the receiving switch system by sending an initial address message (IAM) from the service switching point, confirming the connection to the service switching point by an address complete message (ACM) from the receiving switch system, ringing the receiving telephone by the receiving switch system, sending a call progress message (CPG) to the service switching point from the receiving switch system, answering a receiver connection to the service switching point from the receiving switch system by sending an answer message (ANM) when a receiver operates the receiving phone, and stopping the commercial information by sending a release message to the intelligent peripheral from the service switching point;

answering a receiver connection to the originating switch system by sending an answer message from the service switching point in case of free of charge ringback tone type;

connecting the originating telephone and the receiving telephone; and requesting a release to the service switching point from the originating switch, system by sending a release message (REL) when the originating telephone is disconnected from the originating switch system, confirming the release to the originating switch system from the service switching point by sending a release complete message (RLC), requesting a release to the receiving switch system from the service switching point by sending a release message (REL), confirming the release to the service switching point from the receiving switch system by sending a release complete message (RLC), and finishing the communication by disconnecting the receiving telephone from the receiving switch system.

14. The method as recited in claim 1, wherein a subscriber connection methods includes methods to make a call an ordinary phone number of normal subscriber, to make a call the ordinary phone number of the receiver by a pre-registered subscriber, and to call a special phone number, and system constructions for generating the commercial information in forms of a voice, a text or an image includes a device built-in-switch type, a system built-out-switch type and an intelligent network type, and protocols for connecting the information generating system and the switch systems includes No. 7 ISUP, R2MFC, IPC, X.25, TCP/IP etc, and subscriber's private information are classified into gender, age, region, time band, and earning and the originating telephone is provided from the information generating system commercial information instead of an original ringback tone during a communication wait by selectively the subscriber's private information.

15. The method as recited in claim 1, wherein the commercial information excluding the ringback tone or the guide message includes at least one of advertisement, music, news, greeting information, weather, sports, stock, humor, entertainment, bio-rhythm, fortune, position, entertainer, fee information, and the subscriber includes at least one of wire communication subscribers or wireless communication subscribers such as mobile communication subscribers.

16. The method as recited in claim 1, wherein the communication system includes at least one of a wire communication system or a wireless communication system including a mobile communication system for communication between an originating side and a receiving side, the commercial information excluding the ringback tone or the guide message have at least one form of a voice form, a text form or an image form.

17. The method as recited in claim 1, wherein the call process function transmitting to the originating telephone of the subscriber the commercial information excluding the ringback tone or the guide message instead of the ringback tone during a communication wait, is applied to at least one of the patterns possible to be combined with an original ringback tone or an original guide message and the commercial information such as a first pattern for transmitting the commercial information to the originating telephone during a communication wait, a second pattern for transmitting the commercial information to the originating telephone after transmitting the ringback tone or the guide message with a fixed count during a communication wait, a third pattern for transmitting the ringback tone or the guide message to the originating telephone after transmitting the commercial information for a predetermined time during a communication wait, a fourth pattern for transmitting the ringback tone or the guide message to the originating telephone after transmitting the commercial information to the originating telephone for the predetermined time since the ringback tone or the guide message with a fixed count transmits during a communication wait, and a fifth pattern for simultaneously transmitting the ringback tone or the guide message and the commercial information.

* * * * *